US011637965B2

United States Patent
Zhao et al.

(10) Patent No.: US 11,637,965 B2
(45) Date of Patent: Apr. 25, 2023

(54) HIGH DYNAMIC RANGE POINT SPREAD FUNCTION GENERATION FOR IMAGE RECONSTRUCTION

(71) Applicant: Samsung Electronics Company, Ltd., Suwon si (KR)

(72) Inventors: Ye Zhao, San Jose, CA (US); Changgeng Liu, San Jose, CA (US); Ernest Rehmatulla Post, San Francisco, CA (US); Brian R. Patton, San Francisco, CA (US); Congzhong Guo, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/724,285

(22) Filed: Apr. 19, 2022

(65) Prior Publication Data

US 2022/0256073 A1     Aug. 11, 2022

Related U.S. Application Data

(63) Continuation of application No. 17/169,268, filed on Feb. 5, 2021, now Pat. No. 11,343,440.

(51) Int. Cl.
*H04N 5/235*      (2006.01)

(52) U.S. Cl.
CPC ......... *H04N 5/2355* (2013.01); *H04N 5/2353* (2013.01)

(58) Field of Classification Search
CPC ...... H04N 5/2355; H04N 5/213; H04N 19/36; H04N 5/2353
See application file for complete search history.

(56) References Cited

U.S. PATENT DOCUMENTS

| 8,654,234 B2* | 2/2014 | Hirsch | G06F 3/0425 |
| | | | 348/290 |
| 8,848,063 B2* | 9/2014 | Jo | H04N 5/2355 |
| | | | 348/229.1 |
| 11,368,617 B2* | 6/2022 | Zhou | G06T 5/001 |

* cited by examiner

*Primary Examiner* — Ahmed A Berhan

(57) ABSTRACT

A method includes capturing, by a camera disposed behind a display panel of an electronic device, a plurality of point spread functions (PSFs) through a semi-transparent pixel region of the display panel. Each of the plurality of PSFs is captured at a different exposure time. The method further includes generating an intensity dataset corresponding to the plurality of PSFs, the intensity dataset comprises a plurality of pixel location and a plurality of exposure times associated with the respective pixel locations, calculating a plurality of noise statistics values for the plurality of pixel locations of the intensity dataset, respectively, generating a pixel mask, the pixel mask filters the plurality of pixel locations for pixel locations with respective noise statistics values within a particular threshold, generating one or more high dynamic range (HDR) PSFs utilizing the plurality of PSFs and the pixel mask.

20 Claims, 23 Drawing Sheets

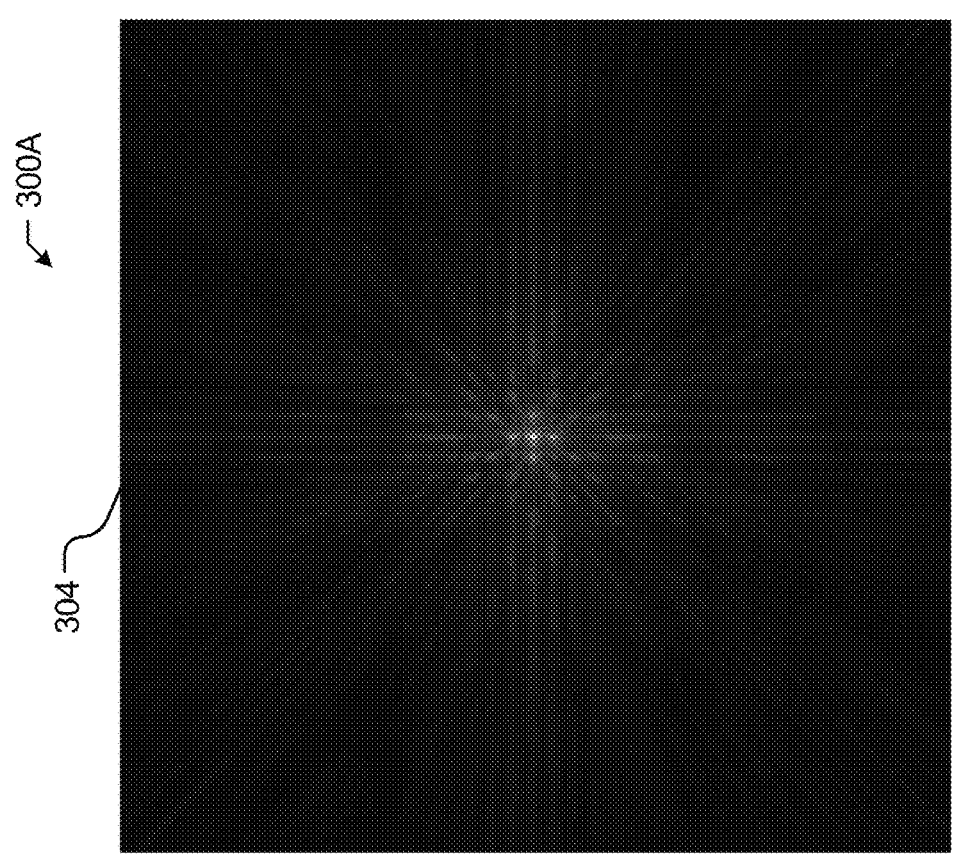
*A compact PSF keeps energy concentrated in the central region*
FIG. 3A
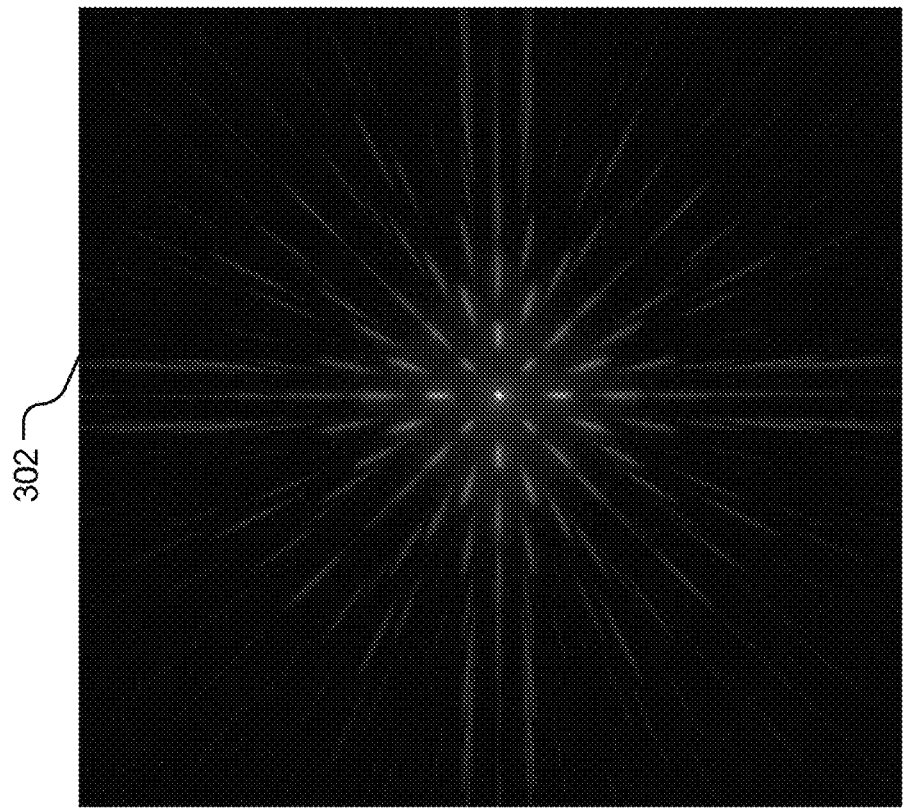
*A widely spread PSF*

*Actual PSF Sampled by the sensor at 2.5μm per pixel (cropped at center region)*

*Original PSF sampled with 0.5μm per pixel (cropped at center region)*

*Illustration of the process for obtaining the high dynamic range PSF for each of R, G, B channel.*

HIGH DYNAMIC RANGE POINT SPREAD FUNCTION GENERATION FOR IMAGE RECONSTRUCTION

PRIORITY

This application is a continuation under 35 U.S.C. § 120 of U.S. patent application Ser. No. 17/169,268, filed 5 Feb. 2021, which is incorporated herein by reference.

TECHNICAL FIELD

This disclosure relates generally to electronic displays, and, more particularly, to the generation of a high dynamic range (HDR) point spread function (PSF) for reconstruction of images captured by a camera behind the electronic displays.

BACKGROUND

Electronic displays, such as active matrix liquid crystal displays (AMLCDs), active matrix organic light emitting displays (AMOLEDs), and micro-LED displays are typically the types of displays that are deployed for use in personal electronic devices (e.g., mobile phones, tablet computers, smartwatches, and so forth). Such personal electronic devices may generally include a front-facing camera, which may be disposed adjacent to the display, and may be utilized most often by users to capture self-portraits (e.g., "selfies"). However, as front-facing camera systems grow in complexity (e.g., depth cameras), more and more of the area designated for the display of the electronic device may be traded off to expand the area designated for the camera system. This may lead to a reduction in resolution and viewing area of the display. One technique to overcome the reduction in resolution and viewing area of the display may be to dispose the front-facing camera system completely behind or underneath the display panel. However, disposing the front-facing camera system behind the display panel may often degrade images captured by the front-facing camera. It may be thus useful to provide improved techniques to reconstruct images captured by front-facing camera systems disposed behind a display panel.

BRIEF DESCRIPTION OF THE DRAWINGS

FIGS. 3A, 3B, and 3C illustrate experimental examples of different PSFs that may be measured.

DESCRIPTION OF EXAMPLE EMBODIMENTS

Figure 1A:
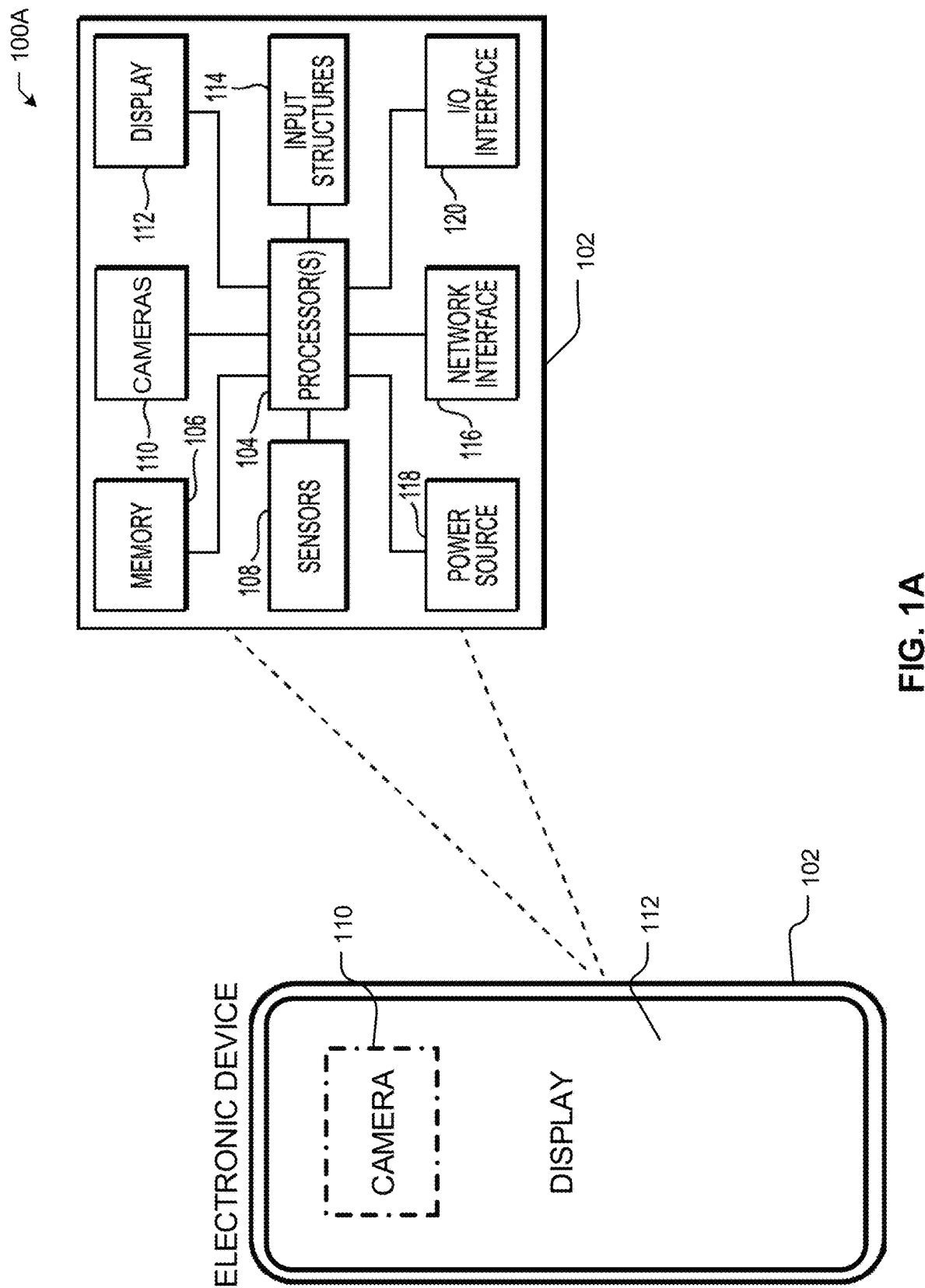
FIG. 1A illustrates an example diagram of an electronic device.

The present embodiments are directed toward techniques for generating a high dynamic range (HDR) point spread function (PSF) and determining a spatially invariant low-resolution PSF for image reconstruction based thereon. In particular embodiments, an electronic device may capture, by a camera disposed behind a display panel of the electronic device, a number of point spread functions (PSFs) through a semi-transparent pixel region of the display panel. In particular embodiments, each of the number of PSFs may be captured at a different exposure time. For example, in particular embodiments, the camera behind the display panel of the electronic device may capture the number of PSFs by capturing the number of PSFs through one or more magnifying optical elements disposed between the camera lens and an image sensor of the camera. For example, in particular embodiments, the one or more magnifying optical elements may include one or more objective lens and one or more tube lens.

In particular embodiments, the electronic device may then determine, for each of the number of PSFs, pixel intensity data for each of a number of pixel locations of the PSF. In particular embodiments, the pixel intensity data may be associated with the exposure time of the respective PSF. For example, in particular embodiments, the electronic device may determine, for each of the PSFs, the pixel intensity data per unit of time by determining, for each of the PSFs, a ratio value of the pixel intensity data to the exposure time of the respective PSF. In particular embodiments, the electronic device may then calculate, for each pixel location, a weighted average pixel intensity value based on the pixel intensity data and the exposure time for the respective pixel location over the number of PSFs. In particular embodiments, the electronic device may then generate a high dynamic range (HDR) PSF utilizing the weighted average pixel intensity values. For example, in particular embodiments, the electronic device may generate the HDR PSF by generating a respective HDR PSF for each of a first color channel, a second color channel, and a third color channel. In particular embodiments, the electronic device may also generate the HDR PSF for deriving a spatially-invariant and low-resolution HDR PSF from the HDR PSF. For example, in particular embodiments, the spatially-invariant and low-resolution HDR PSF may be derived from the HDR PSF to reconstruct images captured by the camera disposed behind the display panel of the electronic device.

In this way, the present embodiments may increase the viewing area and the resolution of the display of the electronic device by disposing one or more front-facing cameras of the electronic device behind the display. For example, because of the increase in display area (e.g., having eliminated the display area typically designated for the one or more front-facing cameras), the electronic device may further provide for improved graphical user interfaces (GUI) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device, as well as allow a user of the electronic device to display higher resolution images on the display of the electronic device. Still further, because the one or more front-facing cameras may be placed behind the display, the present techniques may allow the one or more front-facing cameras to be placed anywhere (e.g., in a center area of the display), as opposed to in a corner or along an edge of the display of the electronic device. This may provide an improved user experience and/or GUI, such as by directing a user taking a selfie to gaze at the center area of the display and further by giving the impression of eye-to-eye contact with another user when the user is participating in a video-conference, a videotelephonic exchange, or other video-streaming service.

Furthermore, it should be appreciated that while the present embodiments are described primarily with respect to generating high dynamic range PSFs and determining a spatially invariant low-resolution PSF for image reconstruction based thereon utilizing a particular arrangement of cameras, magnifying optical elements, and light sources, the present embodiments further contemplate generating high dynamic range PSFs and determining a spatially invariant low-resolution PSF for image reconstruction based thereon utilizing any suitable arrangements of cameras, magnifying optical elements, light sources, and so forth. As such, the present embodiments as described herein may be used for generating high dynamic range PSFs and determining a spatially invariant low-resolution PSF for image reconstruction based thereon in any system where images captured by the system may be distorted (e.g., blurred) due to, for example, an inability of certain display panels to spread PSF light energy sufficiently, such that the exact spatial features of the PSF may be resolved and captured with a conventional camera sensor. For example, in addition to a camera disposed behind a display panel, the particular embodiments may equally apply to applications in which, for example, an image is captured through micro-perforations utilizing a concealed camera and/or utilizing an inverse filter to generate a higher-quality image than that achievable by less advanced optical devices.

FIG. 1A illustrates an example diagram 100A of an electronic device 102. In particular embodiments, the electronic device 102 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display panel 112, input structures 114, network interfaces 116, a power source 118, and an input/output (I/O) interface 120. It should be noted that FIG. 1 is merely one example of a particular implementation and is intended to illustrate the types of components that may be included as part of the electronic device 102.

In particular embodiments, the one or more processor(s) 104 may be operably coupled with the memory 106 to perform various algorithms for providing interactive music conducting and composing activity through intelligence-based learning progression. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display panel 112 may include any display architecture (e.g., AMLCD, AMOLED, micro-LED, and so forth), which may provide further means by which users may interact and engage with the electronic device 102. In particular embodiments, as further illustrated by FIG. 1, one more of the cameras 110 may be disposed behind or underneath (e.g., as indicated by the dashed lines of electronic device 102) the display panel 112 (e.g., one or more of the cameras 110 may be completely concealed by the display panel 112), and thus the display panel 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display panel 112, such as at a center area behind the display panel 112, at an upper area behind the display panel 112, or at a lower area behind the display panel 112.

In particular embodiments, the input structures 114 may include any physical structures utilized to control one or more global functions of the electronic device 102 (e.g., pressing a button to power "ON" or power "OFF" the electronic device 102). The network interface 116 may include, for example, any number of network interfaces suitable for allowing the electronic device 102 to access and receive data over one or more cloud-based networks (e.g., a cloud-based service that may service hundreds or thousands of the electronic device 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 102 for operation. Similarly, the I/O interface 120 may be provided to allow the electronic device 102 to interface with various other electronic or computing devices, such as one or more auxiliary electronic devices.

Figure 1B:
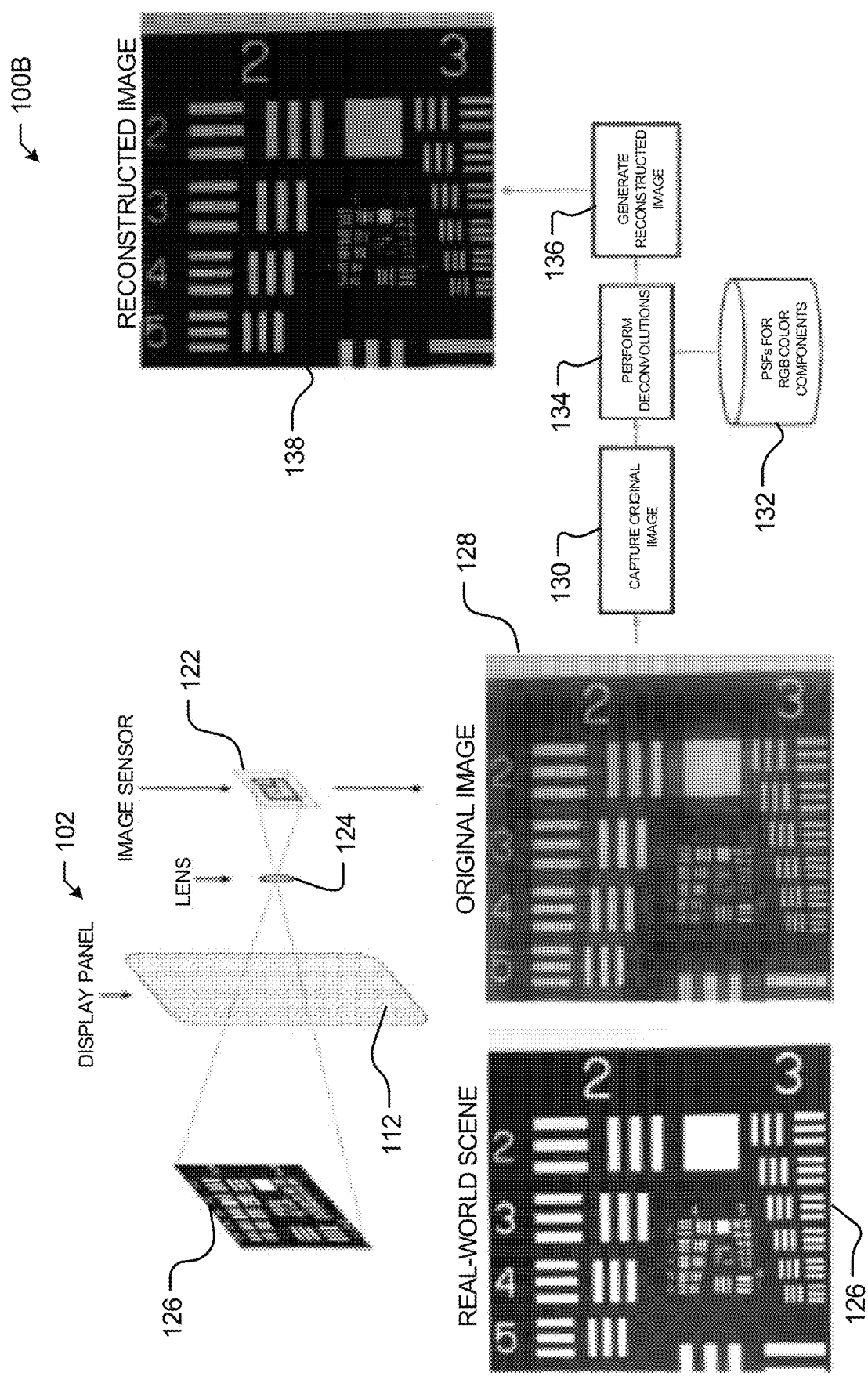
FIG. 1B illustrates an example system and workflow diagram for reconstructing images captured by a camera disposed behind a display of an electronic device.

FIG. 1B illustrates an example system and workflow diagram 100B for reconstructing images captured by a camera disposed behind a display of an electronic device, in accordance with the presently disclosed embodiments. In particular embodiments, the electronic device 102 may capture, by an image sensor 122 and camera lens 124 disposed behind a display panel 112 of the electronic device 102, an image of a real-world scene 126. In particular embodiments, the image of the real-world scene 126 captured by the image sensor 122 may correspond to an original image 128. In particular embodiments, based on the image of the real-world scene 126 being captured by the image sensor 122 through the display panel 112, the original image 128 may be degraded (e.g., blurred or distorted). In particular embodiments, after performing (at functional block 130) the capturing of the original image 128, the electronic device 102 may retrieve, for one or more pixel regions of the original image 128, the PSFs (e.g., a function of 3D diffraction pattern of light emitted from an imperceptibly small point light source and captured by one or more image sensors 122) for each of the RGB color components of the original image 128. In particular embodiments, that may be stored on the electronic device 102. In particular embodiments, the electronic device 102 may determine the respective PSF for each of the RGB color components by selecting (at functional block 132), from the memory 106 of the electronic device 102, the premeasured PSFs for each of the RGB color components. In particular embodiments, the electronic device 102 may determine multiple PSFs in various pixel regions of the real-world scene 126 to capture the PSFs' variation with the angle of incidence to the optical axis of the display panel 112, for example.

In particular embodiments, electronic device 102 may then perform (at functional block 134), for the number of pixel regions of the original image 128, a deconvolution of each of the RGB color components of the original image 128 based on their respective PSFs. In particular embodiments, the electronic device 102 may perform the deconvolution of each of the RGB color components by performing a Richardson-Lucy deconvolution of each of the RGB color components or by performing a Tikhonov regularized inverse filter deconvolution of each of the RGB color components. In particular embodiments, other deconvolution techniques may be utilized. In particular embodiments, the electronic device 102 may then generate (at functional block 136) a reconstructed image 138 corresponding to the original image 128 based on the deconvolutions of each of the RGB color components. As illustrated by comparison of the original image 128 to the reconstructed image 138, the electronic device 102 may generally generate the reconstructed image 138 by removing a blurring effect of the original image 128.

Figure 2:
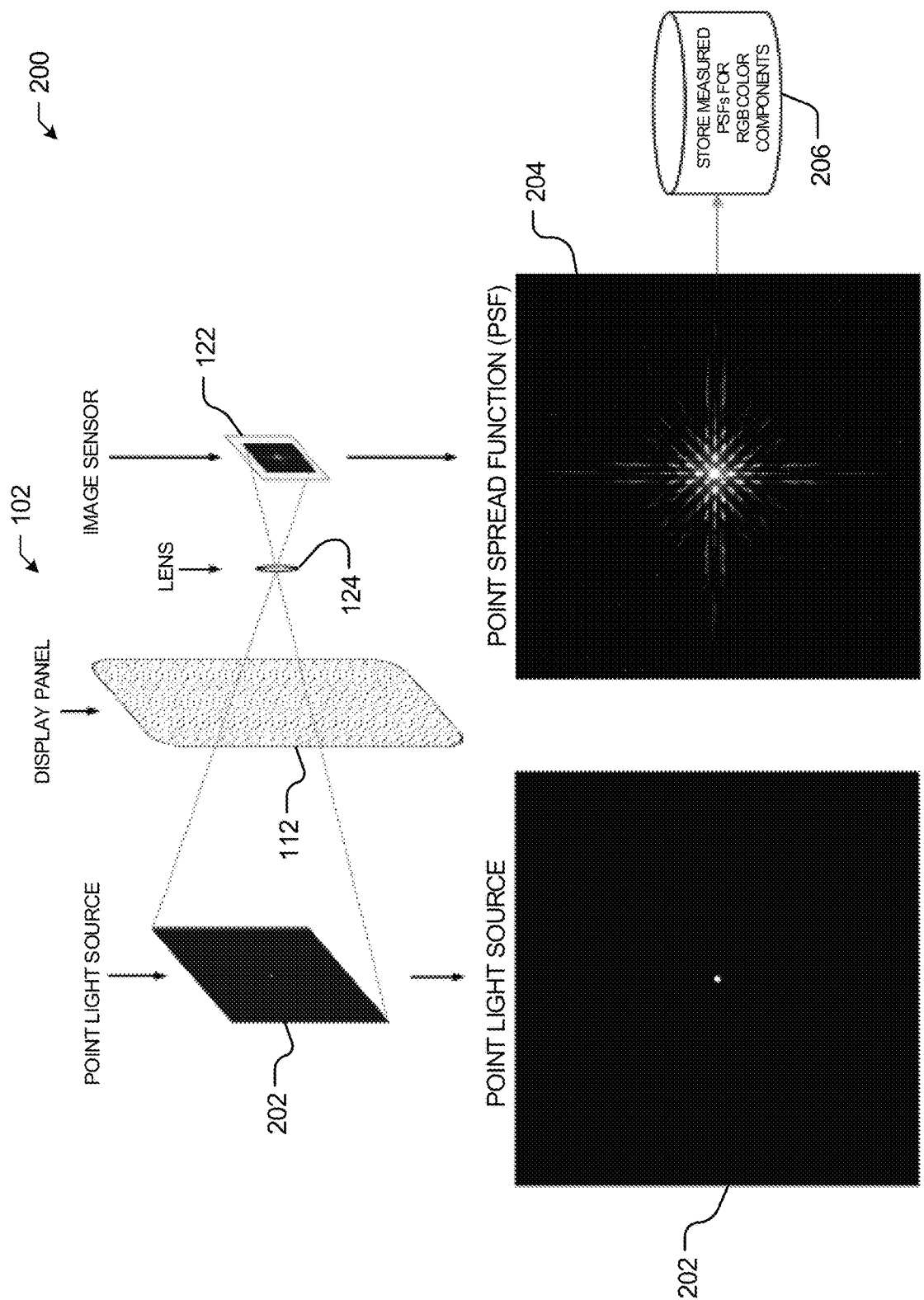
FIG. 2 illustrates an example system and workflow diagram for measuring and storing one or more point spread function (PSFs) of an electronic device.

FIG. 2 illustrates an example system and workflow diagram 200 for measuring and determining one or more premeasured point spread functions (PSFs) (e.g., individually for each of the RGB color components and/or one or more particular monochromatic color components) of an electronic device, in accordance with the presently disclosed embodiments. In particular embodiments, to reconstruct a degraded original image, the electronic device 102 may premeasure (e.g., determine experimentally during a calibration process and/or manufacturing process of the electronic device 102) and store the PSFs of the electronic device 102. In particular embodiments, as depicted by FIG. 2, point light source 202 (e.g., a white LED or an array of white LEDs) may emit a light wave into the direction of the electronic device 102 through, for example, a pinhole or other imperceptibly small aperture. In particular embodiments, the light wave may pass through, for example, the display panel 112, the camera lens 124, and may be ultimately detected by the image sensor 122.

In particular embodiments, the electronic device 102 may then premeasure the one or more PSFs 204 for each of the RGB color components and/or one or more particular monochromatic color components based on, for example, a sampling of a transfer function corresponding to an effect of the display panel 112 in response to the point light source 202. For example, in particular embodiments, the one or more PSFs of the electronic device 102 may represent the intensity response of the point light source 202. In particular embodiments, the electronic device 102 may then store (at database 514) the one or more premeasured PSFs 204 (e.g., for each of the RGB color components and/or one or more particular monochromatic color components) into, for example, the memory 106 to be later utilized to reconstruct images captured by the camera 110 disposed behind the display panel 112 of the electronic device 102.

In particular embodiments, multiple PSFs may be premeasured in different regions of the image field to capture the PSFs' variation with the angle of incidence to the optical axis of the display panel 112, for example. These multiple PSFs (e.g., for each of the RGB color components and/or one or more particular monochromatic color components) may be stored into, for example, a database 206 of the memory 106 to be later utilized to reconstruct pixel regions of images captured by the camera 110 disposed behind the display panel 112 of the electronic device 102, and those reconstructed pixel regions may be then combined into the full reconstructed image. Indeed, as it may be appreciated, the one or more PSFs may describe the exact relationship between a clear image point prior to passing through the display panel 112, and the blurred image point captured by the camera sensor 122 behind the display panel 112. Thus, the one or more PSFs may be primarily determined by the pixel structure of the display panel 112. Therefore, to properly reconstruct the blurred image captured by the camera sensor 122 behind the display panel 112, the PSFs may be measured most accurately.

However, in particular embodiments, as will be further appreciated below, depending on the design of the display panel 112, the display panel 112 may not sufficiently disperse the light of the point light source 202, such that the one PSF may include closely compacted energy distribution in the central region of the captured image. Indeed, the exact spatial features of the PSF may be difficult to be resolved and captured utilizing only a conventional camera sensor 122. Firstly, the intensity dynamic range of spatial features of the PSF may exceed the dynamic range of a conventional camera sensor. Additionally, if the camera sensor 122 pixel size is too coarse to correctly sample the one or more PSFs, and, by extension, include insufficient resolution to capture the one or more PSFs accurately, the one or more PSFs may be undersampled and only spatially-variant PSFs may be measured and thus lead to a deterioration in image quality of the images reconstructed utilizing these PSFs. For example, should the one or more PSFs be laterally shifted in either direction due to error in the premeasuring process, the one or more PSFs measured in response to the lateral shift measured utilizing only a conventional camera sensor 122 would result in PSFs markedly different from those one or more PSFs measured prior to the lateral shift. In accordance with the presently disclosed embodiments, it may be thus useful to provide techniques for generating a high dynamic range (HDR) point spread function (PSF) and determining a spatially invariant low-resolution PSF for image reconstruction based thereon.

Figure 3B:
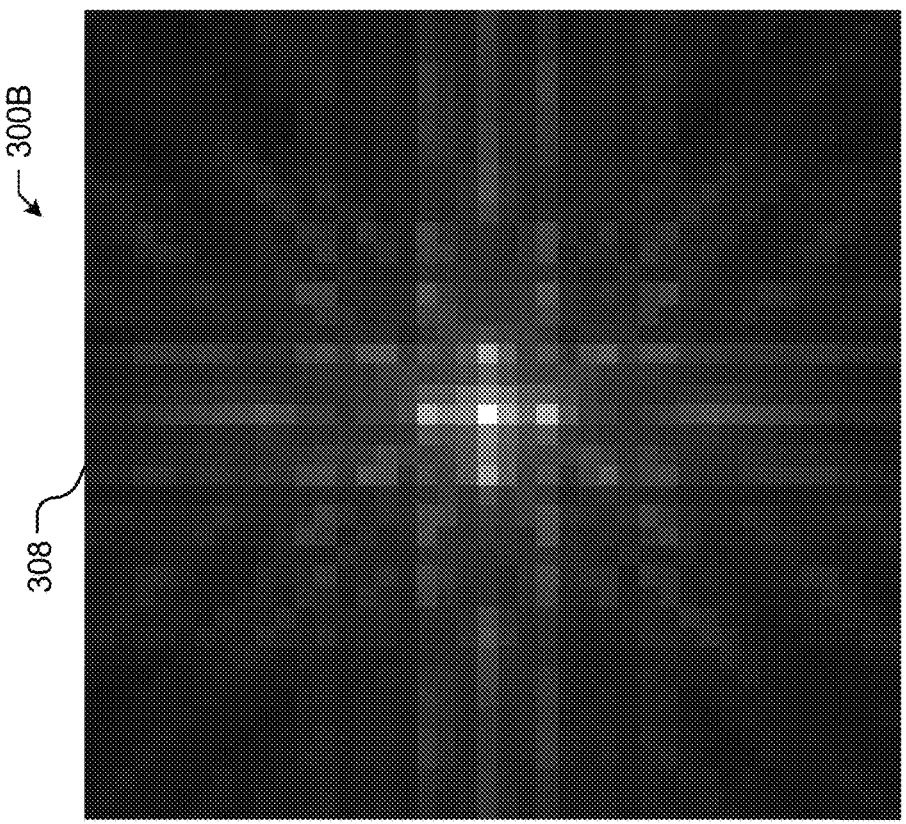
Figure 3B:
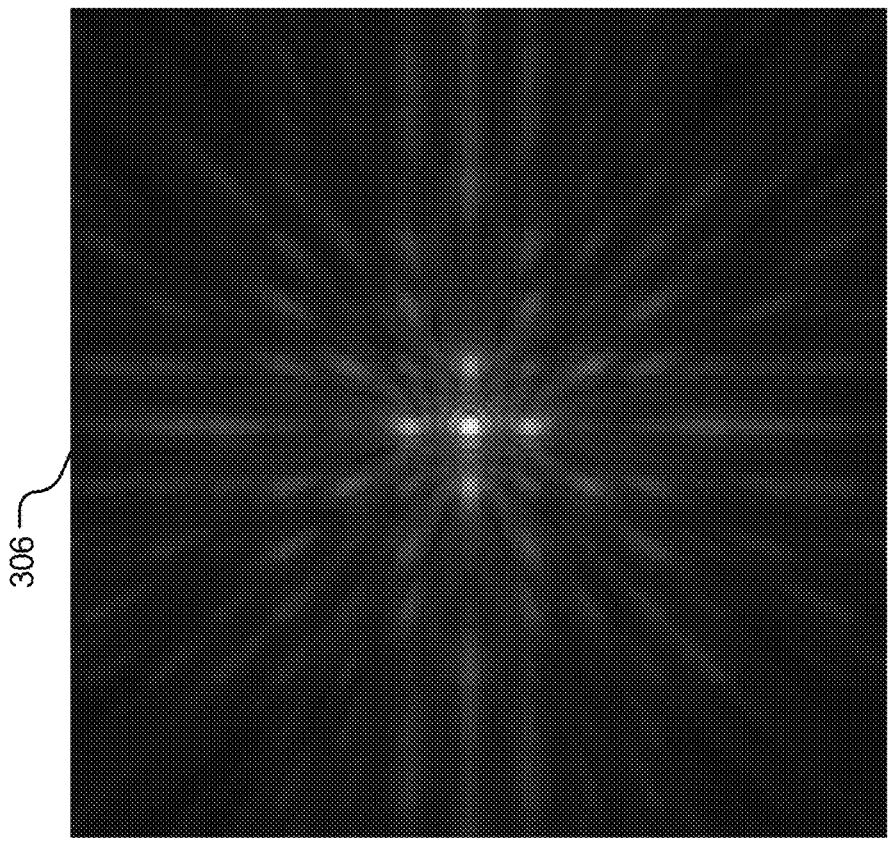
Figure 3C:
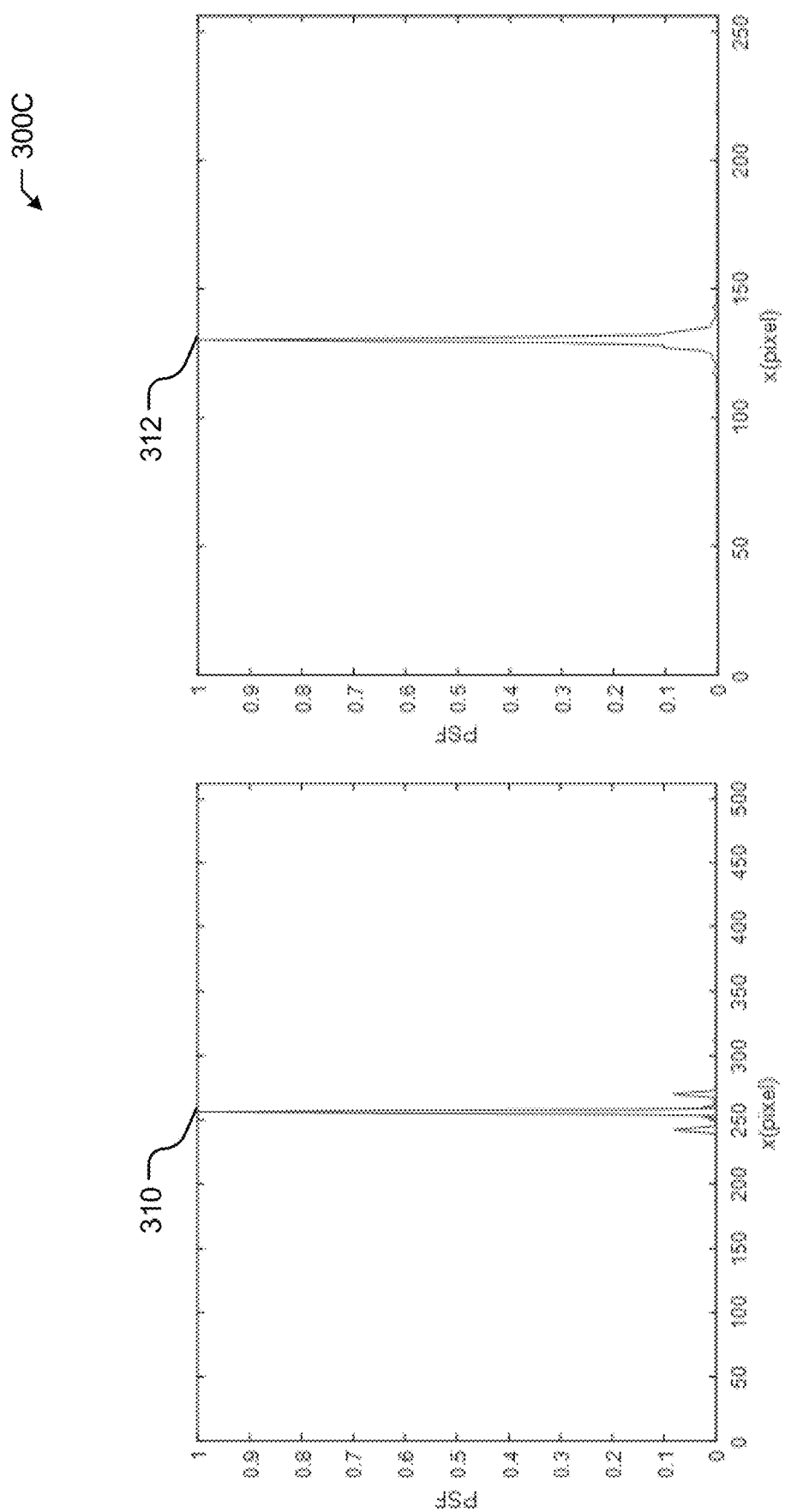

FIGS. 3A, 3B, and 3C illustrate experimental examples 300A, 300B, 300C of different PSFs that may be measured. For example, example 300A of FIG. 3A illustrates a PSF 302, in which the PSF 302 is widely dispersed, as compared to a PSF 304, in which the PSF 304 is closely compacted and the light energy concentrated in the central region. Example 300B of FIG. 3B illustrates an example 306 of utilizing a high-resolution measurement setting to capture the PSF 304 and an example 308 of utilizing a conventional image sensor 122 to capture the PSF 304. While image sensor 122 is able to capture a widely spread PSF 302, it be too coarse to correctly sample the PSFs 304, the captured images 308 may be under-sampled, leading to a loss of information of the PSFs 304. Example 300C of FIG. 3C illustrates an example of spatially variant PSF as a result of capturing PSF 304 with conventional image sensor. The cross-section structures 310 and 312 of PSF 304 are different if the pinhole is potentially slightly shifted due to measurement inaccuracy.

Figure 4:
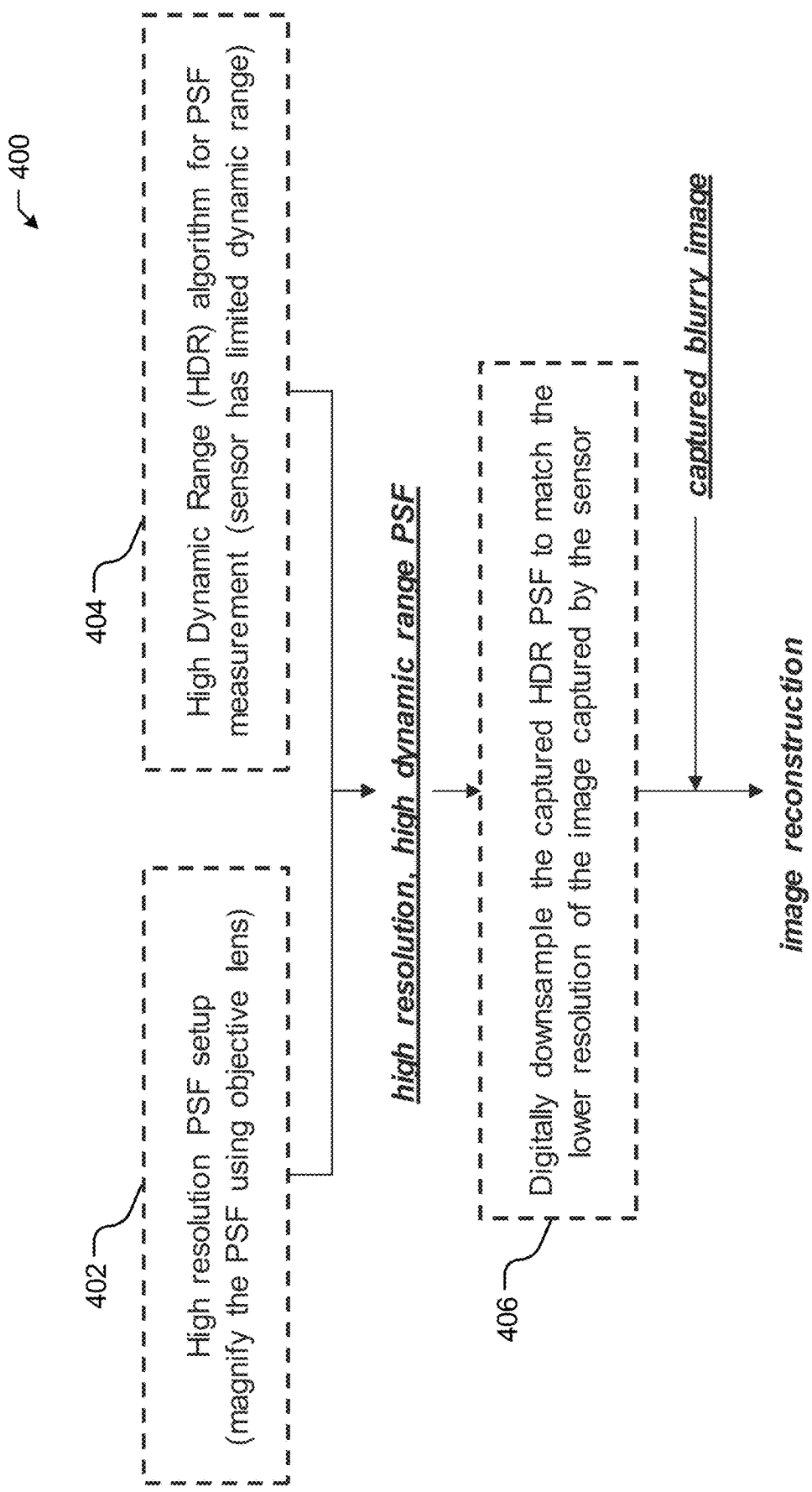
FIG. 4 illustrates a high-level flow diagram of a method for generating a high dynamic range (HDR) PSF and determining a spatially invariant low-resolution PSF for image reconstruction based thereon.

FIG. 4 illustrates a high-level flow diagram of a method 400 for generating a high dynamic range (HDR) PSF and determining a spatially invariant low-resolution PSF for image reconstruction based thereon. In particular embodiments, the method 400 may include at block 402 capturing, by the sensor 122 disposed behind the display panel 112 high resolution PSFs. For example, as will be discussed below with respect to FIG. 5, the high resolution PSFs may be captured through one or more magnifying optical elements (e.g., one or more objective lens and one or more tube lens) disposed between the camera lens 124 and the image sensor 122. In particular embodiments, the method 400 may then include at block 404 generating a high dynamic range (HDR) PSF. Once the high resolution HDR PSF is generated, in particular embodiments, the method 400 may then include at block 406 digitally down-sampling the captured high resolution HDR PSF to match the lower resolution of the image captured by the image sensor 122 and generate a lower resolution PSF that may be utilized for image reconstruction.

Figure 5:
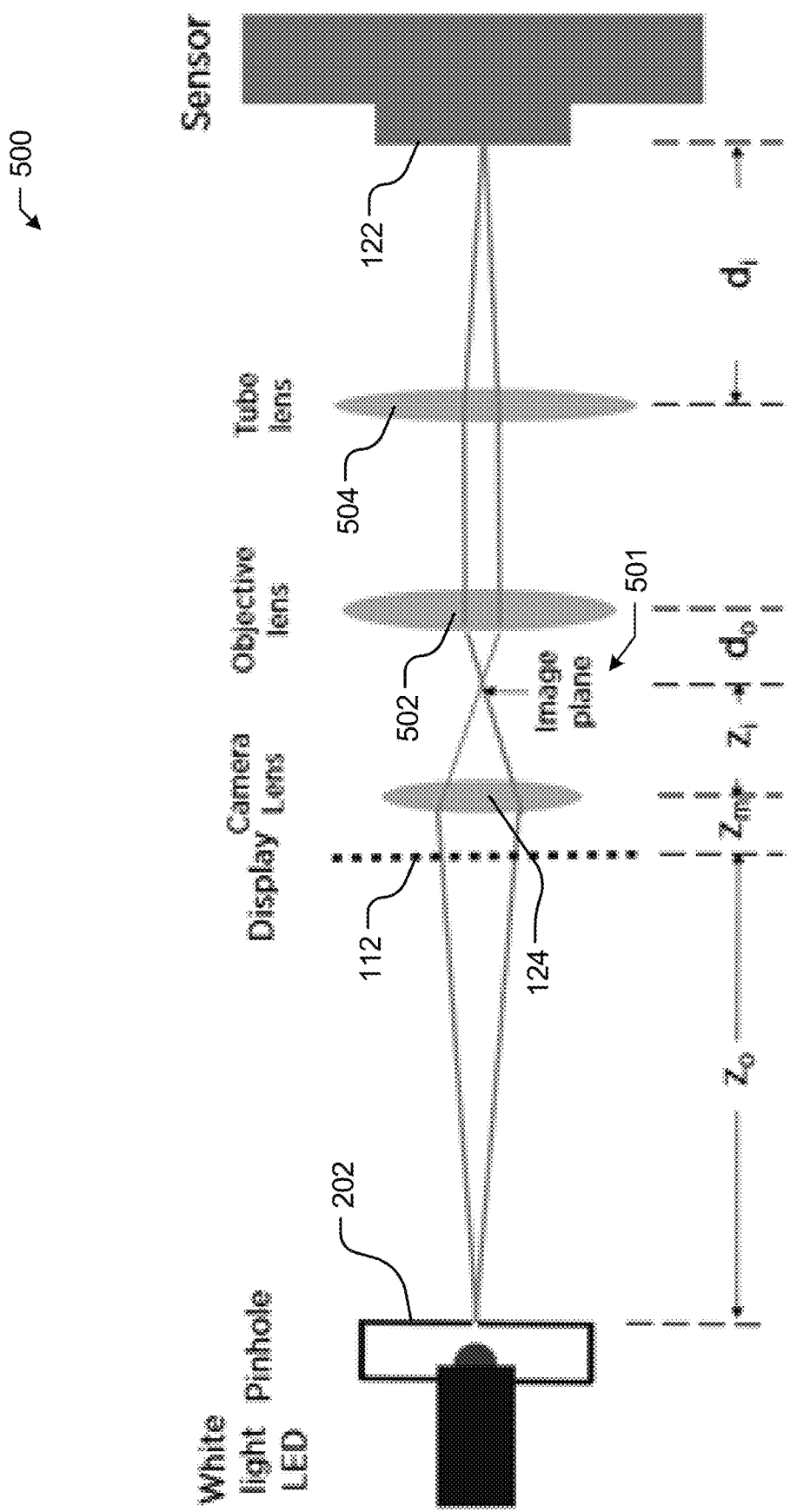
FIG. 5 illustrates an example system for measuring one or more high resolution PSFs of an electronic device.

FIG. 5 illustrates an example system 500 for measuring one or more high resolution PSFs (e.g., individually for each of the RGB color components and/or one or more particular monochromatic color components) of an electronic device, in accordance with the presently disclosed embodiments. For example, as discussed above with respect to FIG. 2, in the low resolution PSF measurement systems such as system 200, the camera sensor 122 may be located closer to the camera lens 124 at the image plane 501. In particular embodiments, in contrast to the system 200, the high resolution PSF measurement system 500 may include one or more magnifying optical elements 502 and 504 disposed between the camera lens 124 and the image sensor 124, and, more specifically, disposed between the camera lens 124 and the image plane 501. For example, in particular embodiments, the one or more magnifying optical elements 502, 504 may include, for example, one or more tube lens, one or more microscope objective lens, and/or one or more other magnifying lens that may be suitable for measuring a high-resolution PSF. For example, in particular embodiments, the magnifying optical element 502 may include an objective lens including, for example, a focal length of 18 mm and numerical aperture (NA) of 0.25 that may be spaced from the image plane 501 by a distance $d_o$. In particular embodiments, the magnifying optical element 504 may include a tube lens that may be matched to the magnifying optical element 502 (e.g., objective lens) that may be spaced by a distance $d_i$ and may include, for example, a focal length of 180 mm. Thus, the magnification achieved by the one or more magnifying optical elements 502, 504 may be, for example, tenfold (e.g., magnification=180 mm/18 mm=10) with respect to the low resolution PSF measurement system 200 discussed above with respect to FIG. 2. In this way, the high resolution PSF measurement system 500 may measure one or more high resolution PSFs.

Figure 6:
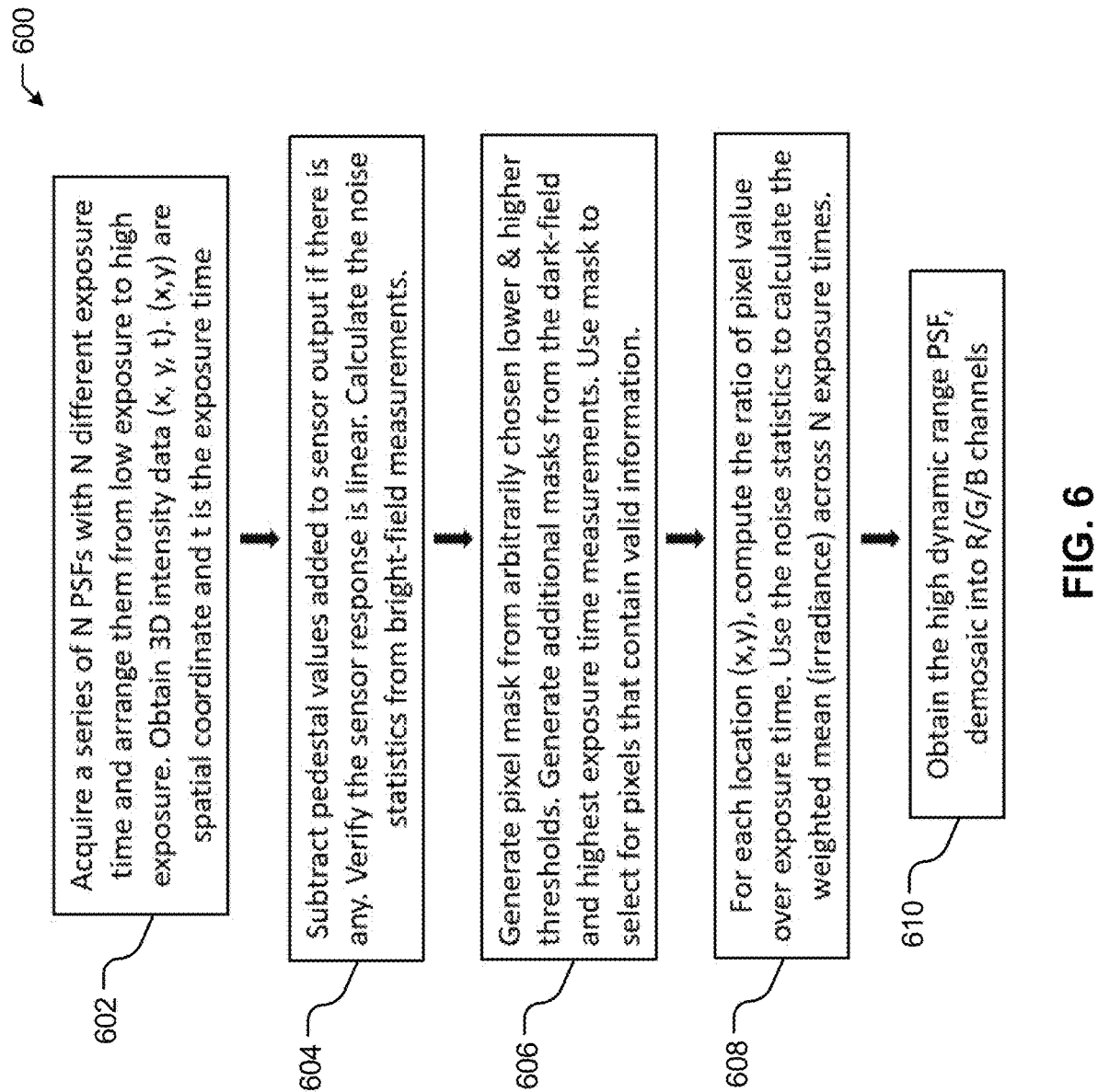
FIG. 6 illustrates a flow diagram of a method for generating high dynamic range (HDR) PSFs based on a linear response image sensor.

FIG. 6 illustrates a flow diagram of a method 600 for generating high dynamic range (HDR) PSFs (e.g., individually for each of the RGB color components and/or one or more particular monochromatic color components) based on linear response image sensor, in accordance with the presently disclosed embodiments. The method 600 may be performed utilizing one or more processing devices (e.g., the one or more processors 104 of the electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 600 may begin at block 602 with the one or more processing devices (e.g., the one or more processors 104 of the electronic device 102) capturing an N number of PSFs with N number of different exposures, arranging or rearranging the N number of PSFs with N different exposures from lowest exposure time to highest exposure time, and determining 3D intensity datasets (x, y, t), in which (x, y) may represent a pixel spatial location while (t) may represent a respective exposure time that may be associated with a respective pixel spatial location (x,y). For example, in particular embodiments, N number of exposure times may be selected based on the image sensor 122 bit depth and the dynamic range of the one or more PSFs being captured. The method 600 may then continue at block 604 with the one or more processing devices (e.g., the one or more processors 104 of the electronic device 102) subtracting an offset from each of the pixels of the captured images, verifying a response of the image sensor 122 is linear, and calculating one or more noise statistics values of bright-field measurements (e.g., bright pixels) in the captured images.

The method 600 may continue at block 606 with the one or more processing devices (e.g., the one or more processors 104 of the electronic device 102) generating one or more pixel masks from pre-determined upper and lower thresholds to avoid noise and saturation, generating additional pixel masks from the dark-field measurements (e.g., dark pixels) and highest exposure times to get non-defective pixels, and utilizing the pixel masks to select only pixels of the images that include valid and useful PSF information. Specifically, in particular embodiments, the one or more pixel masks may be generated masks to remove bright pixel artifacts (e.g., hot pixels), saturated pixels, and any other noisy pixels. Indeed, the one or more masks may determine the pixels that include useful PSF information that may be utilized for HDR PSF generation. The method 600 may continue at block 608 with the one or more processing devices (e.g., the one or more processors 104 of the electronic device 102) computing, for each pixel spatial location (x,y), a ratio of pixel value over exposure time and utilizing the noise statistics values to calculate a weighted average pixel intensity value (e.g., irradiance value) across the N number exposure times. For example, in particular embodiments, the weighted average pixel intensity value (e.g., irradiance value) may indicate an irradiance value at each pixel location (x, y) due to the one or more captured PSFs. The method 600 may then conclude at block 610 with the one or more processing devices (e.g., the one or more processors 104 of the electronic device 102) generating HDR PSFs (e.g., individually for each of the RGB color components and/or one or more particular monochromatic color components) utilizing, example, a linear response image sensor 122.

Figure 7:
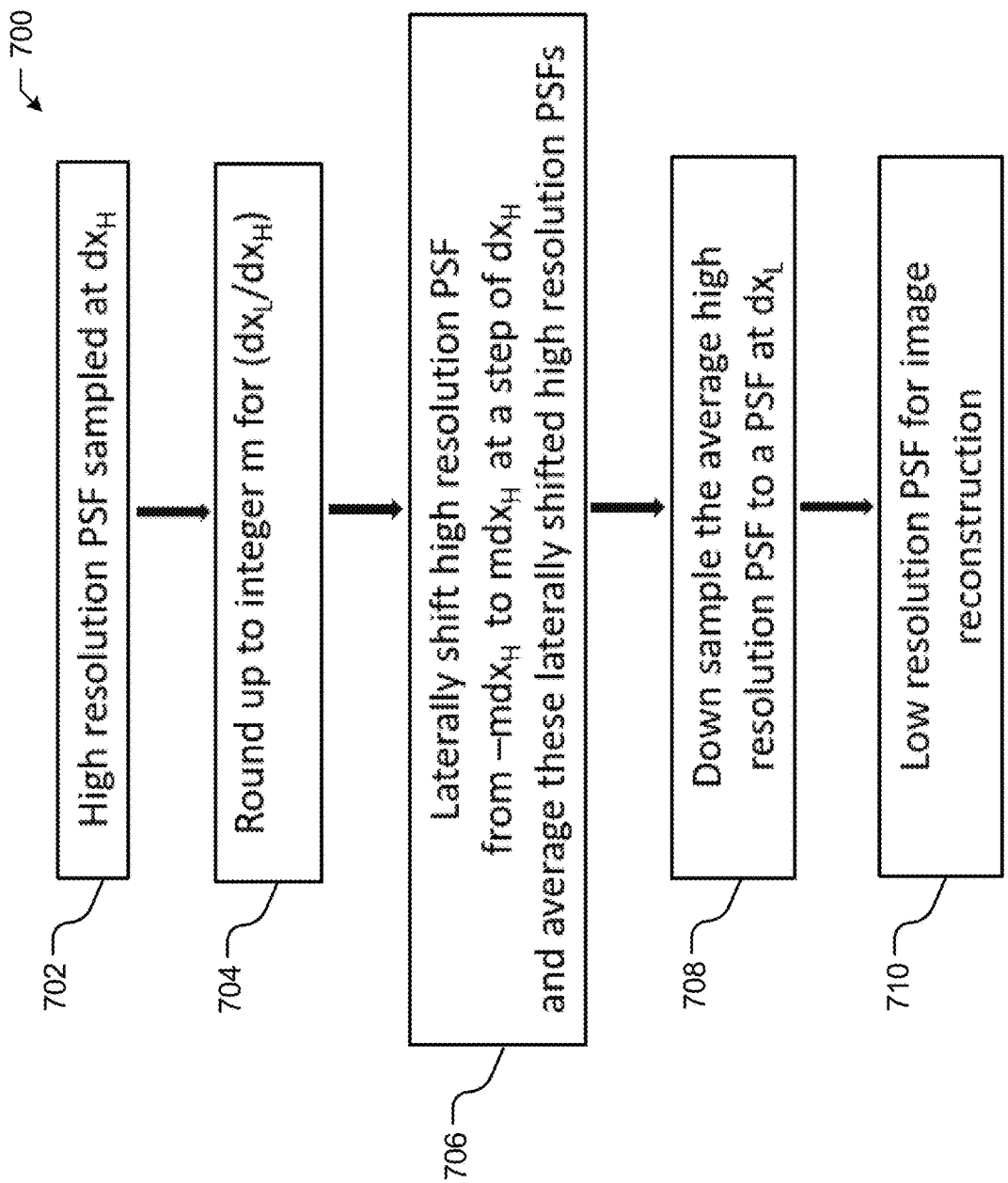
FIG. 7 illustrates a flow diagram of a method for generating low resolution HDR PSFs given high resolution HDR PSFs.

FIG. 7 illustrates a flow diagram of a method 700 for generating low resolution HDR PSFs (e.g., individually for each of the RGB color components and/or one or more particular monochromatic color components) given high resolution HDR PSFs, in accordance with the presently disclosed embodiments. The method 700 may be performed utilizing one or more processing devices (e.g., the one or more processors 104 of the electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. In particular embodiments, the method 700 may sample a high resolution HDR PSF at sampling spacing $dx_H$, which may be utilized to generate a spatially invariant low resolution PSF to match the sensor pixel size $dx_L$, for image reconstruction, in accordance with the presently disclosed embodiments.

The method 700 may begin at block 702 with the one or more processing devices (e.g., the one or more processors 104 of the electronic device 102) sampling a high resolution HDR PSF at sampling spacing $dx_H$. The method 700 may then continue at block 704 with the one or more processing devices (e.g., the one or more processors 104 of the electronic device 102) computing an upper integer m of image sensor 122 pixel size $dx_L$ over 2 times the sampling spacing $dx_H$. The method 700 may continue at block 706 with the one or more processing devices (e.g., the one or more processors 104 of the electronic device 102) laterally shifting the one or more high resolution HDR PSFs from $-mdx_H$ to $mdx_H$ at a step of $dx_H$ and averaging the laterally shifted high resolution HDR PSFs to generate an averaged high resolution PSF. The method 700 may continue at block 708 with the one or more processing devices (e.g., the one or more processors 104 of the electronic device 102) downsampling the averaged high resolution HDR PSF. The method 700 may then conclude at block 710 with the one or more processing devices (e.g., the one or more processors 104 of the electronic device 102) generate a spatially-invariant low-resolution PSF for image reconstruction based on the down-sampled and averaged high resolution HDR PSF e.g., individually for each of the RGB color components and/or one or more particular monochromatic color components).

Figure 8:
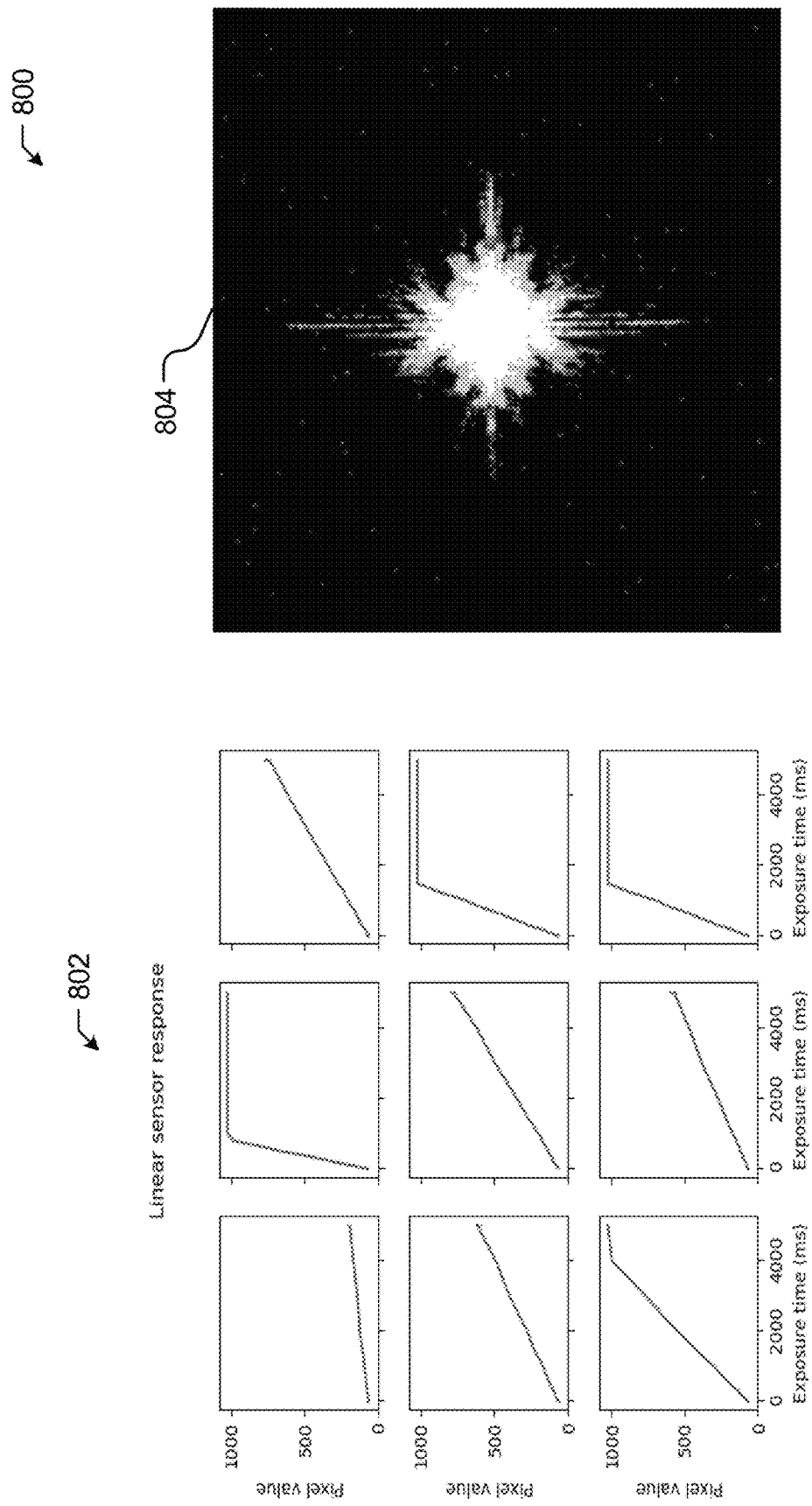
FIG. 8, and FIG. 9 illustrate example experimental data, illustrating an example plot of exposure time vs. pixel value and a high resolution high dynamic range PSF, respectively.
Figure 9:
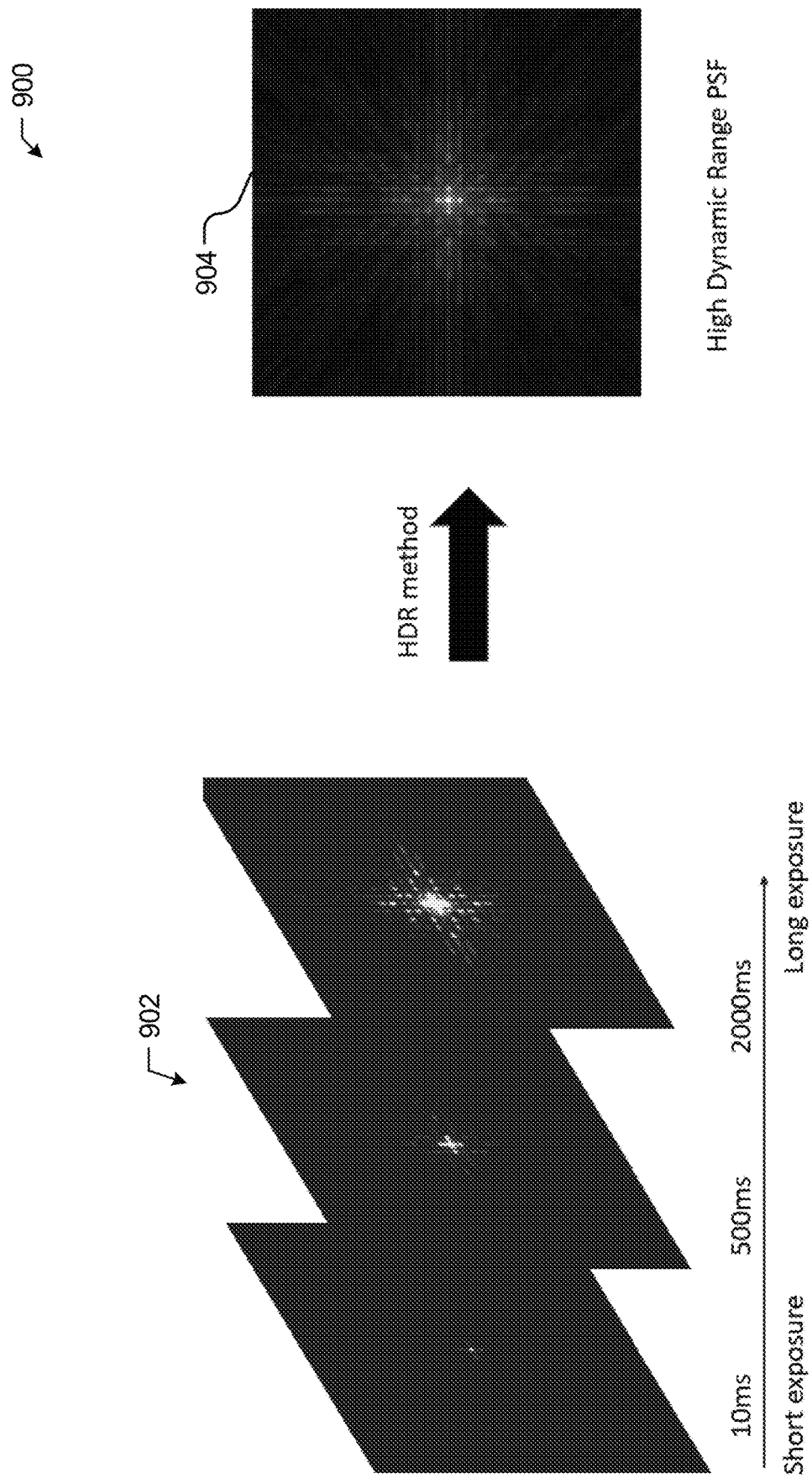

FIG. 8 and FIG. 9 illustrate example experimental data, which shows illustrations of the forgoing techniques discussed above with respect to FIGS. 6 and 7. For example, FIG. 8 illustrates a exposure time vs. pixel value plot 802, which depicts a linear image sensor 122 response, in which each grid represents one pixel and includes with exposure time t on the x-axis and pixel value on the y-axis of the pixel intensity vs. pixel value plot 802. Similarly, an example image 804 may depict an example pixel mask that be utilized to filter for valid pixels to be utilized in the HDR PSF calculation. Similarly, FIG. 9 illustrates the process for obtaining the high resolution high dynamic range PSF for each of RGB color component, in accordance with the presently disclosed embodiments. The example images 902 illustrate an N number of PSFs that may be captured at an N number (e.g., 10 milliseconds (ms), 500 ms, 2000 ms, and so forth). The example image 904 illustrate the high resolution HDR PSF that may be generated utilizing the N number of PSFs that may be captured at the N number (e.g., 10 ms, 500 ms, 2000 ms, and so forth), as generally discussed above with respect to method 600 of FIG. 6.

Figure 10:
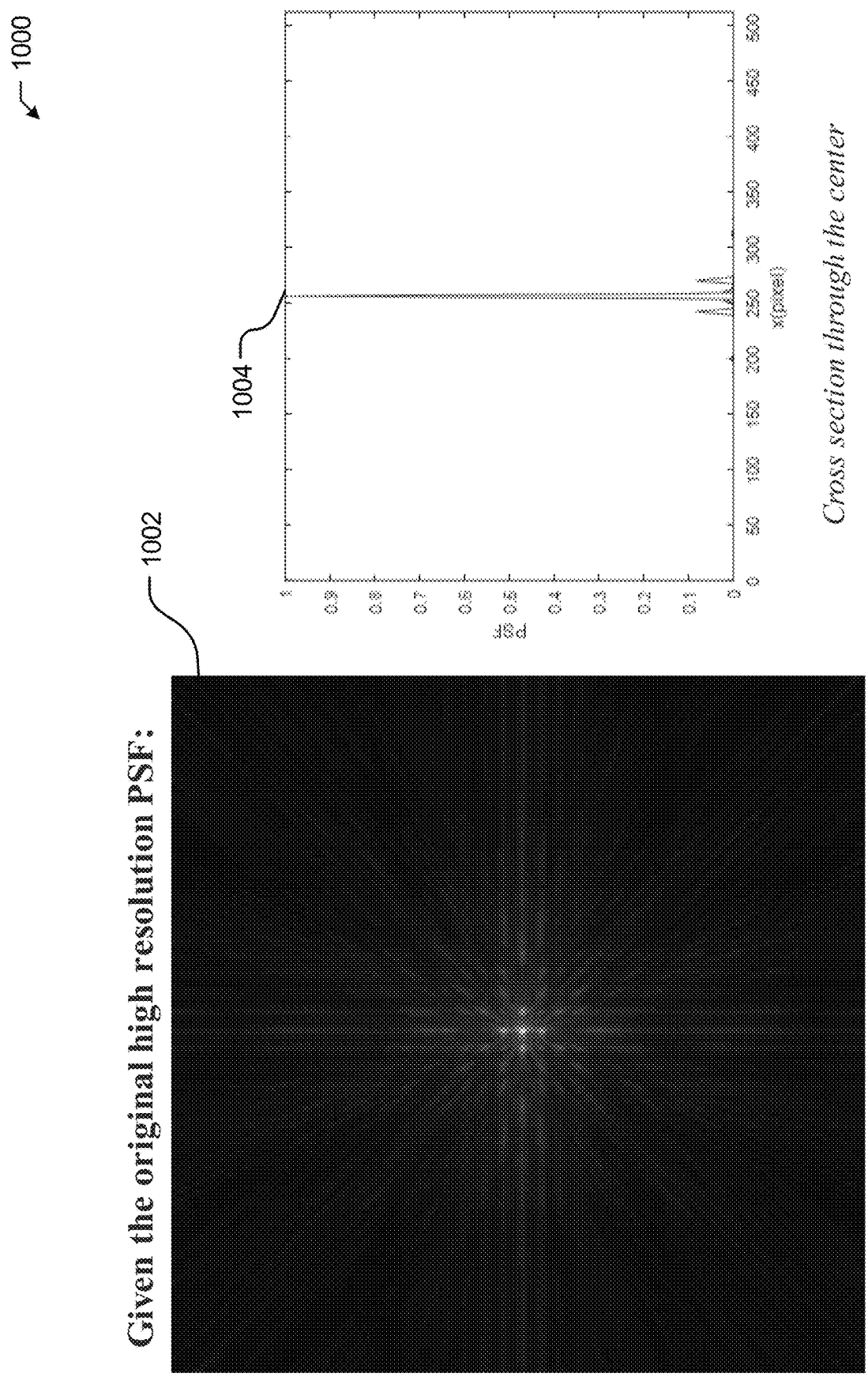
FIGS. 10, 11, and 12A, and 12B illustrate one or more running examples for generating a high dynamic range (HDR) PSF and determining a spatially invariant low-resolution PSF for image reconstruction based thereon.
Figure 11:
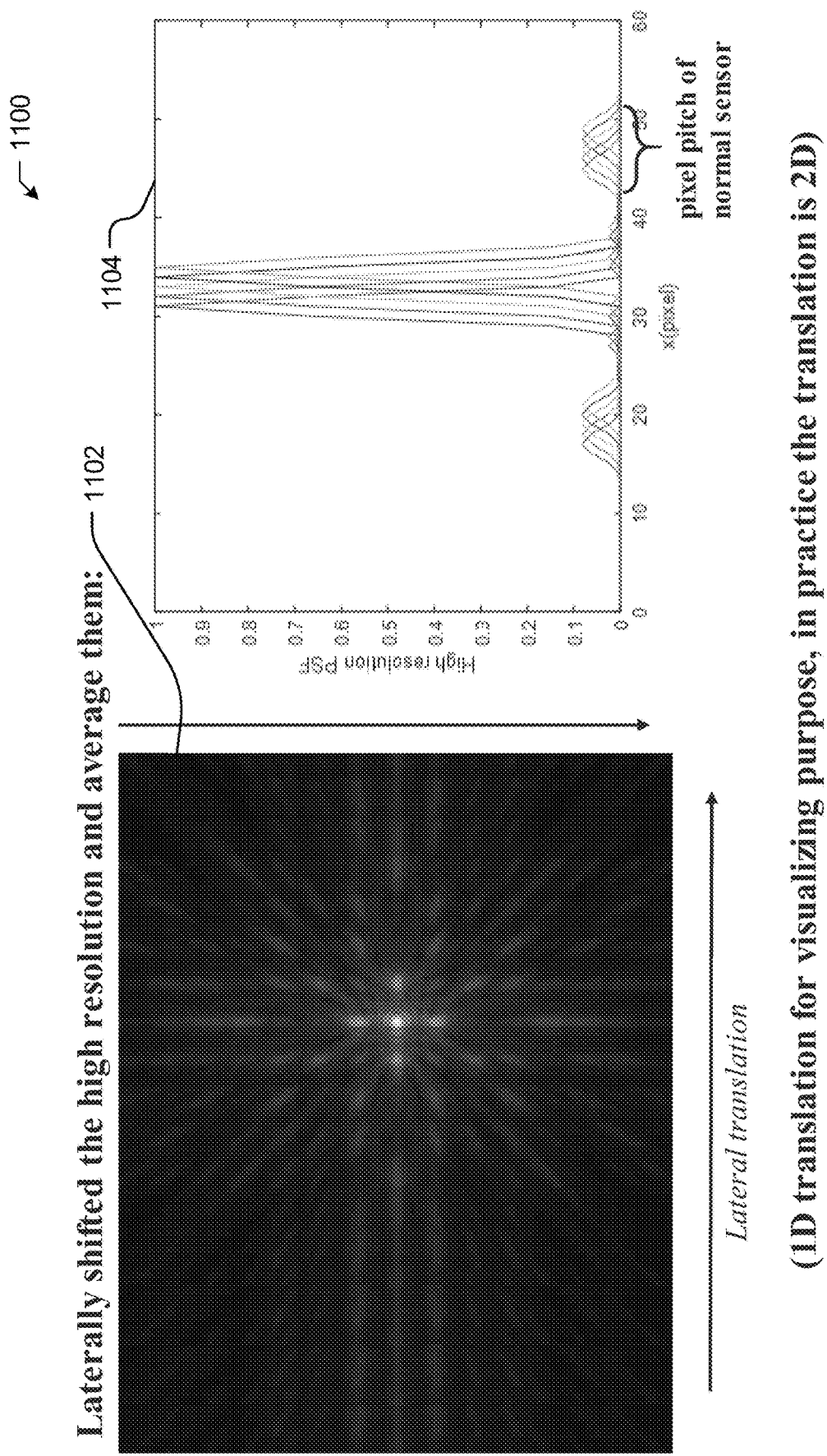
Figure 12A:
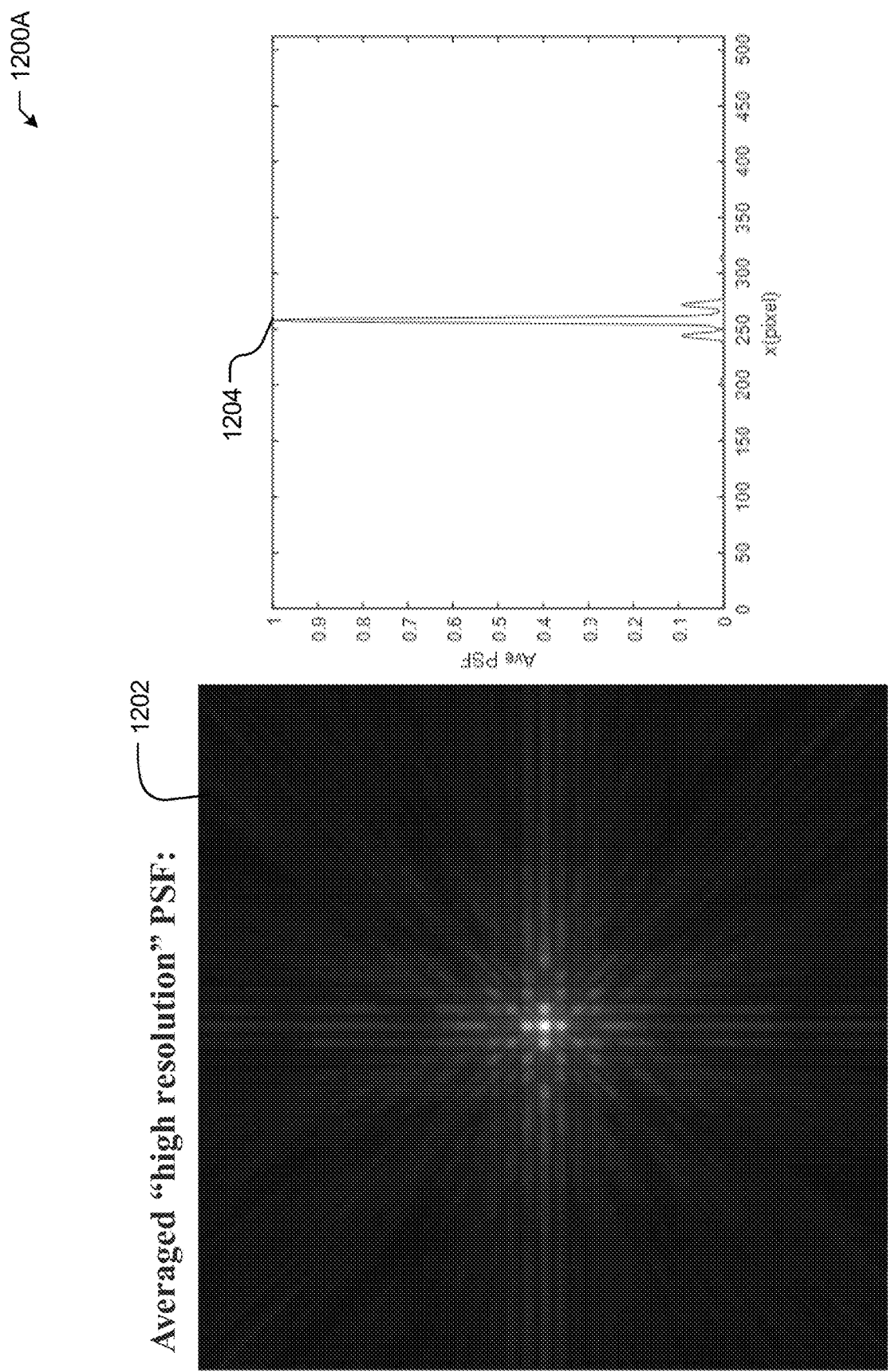
Figure 12B:
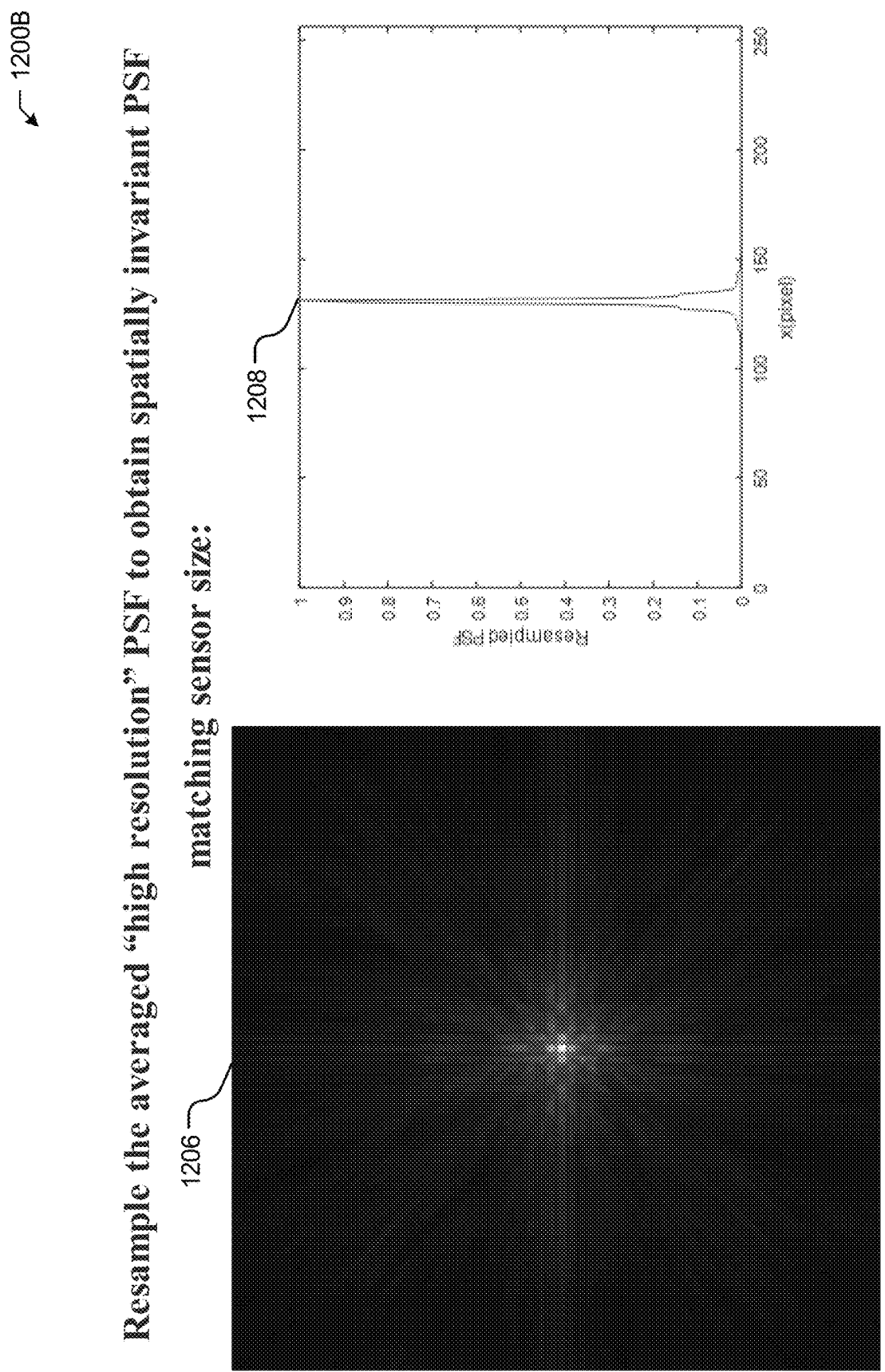

FIGS. 10, 11, and 12A, and 12B illustrate one or more running examples of the presently disclosed techniques for generating a high dynamic range (HDR) point spread function (PSF) and determining a spatially invariant low-resolution PSF for image reconstruction based thereon. For example, FIG. 10 illustrates an original image of a high resolution PSF 1002 and the corresponding cross-sectional output 1004 (e.g., illustrating the side lobe features that may also be captured and not loss in accordance with the presently disclosed embodiments). FIG. 11 illustrates the laterally shifted high resolution HDR PSFs 1102 and the corresponding cross-sectional outputs 1104 (e.g., including the side lobe features). FIG. 12A illustrates the averaged high resolution HDR PSFs 1202 and the corresponding cross-sectional output 1204 (e.g., including the side lobe features), and, finally, FIG. 12B illustrates a resampling of the averaged high resolution HDR PSFs 1206 and the corresponding cross-sectional output 1206 (e.g., including the side lobe features). As can be seen, the example of the resampling of the averaged high resolution HDR PSFs 1206 shows a spatially-invariant low resolution PSF that may be utilized for proper image reconstruction.

Figure 13:
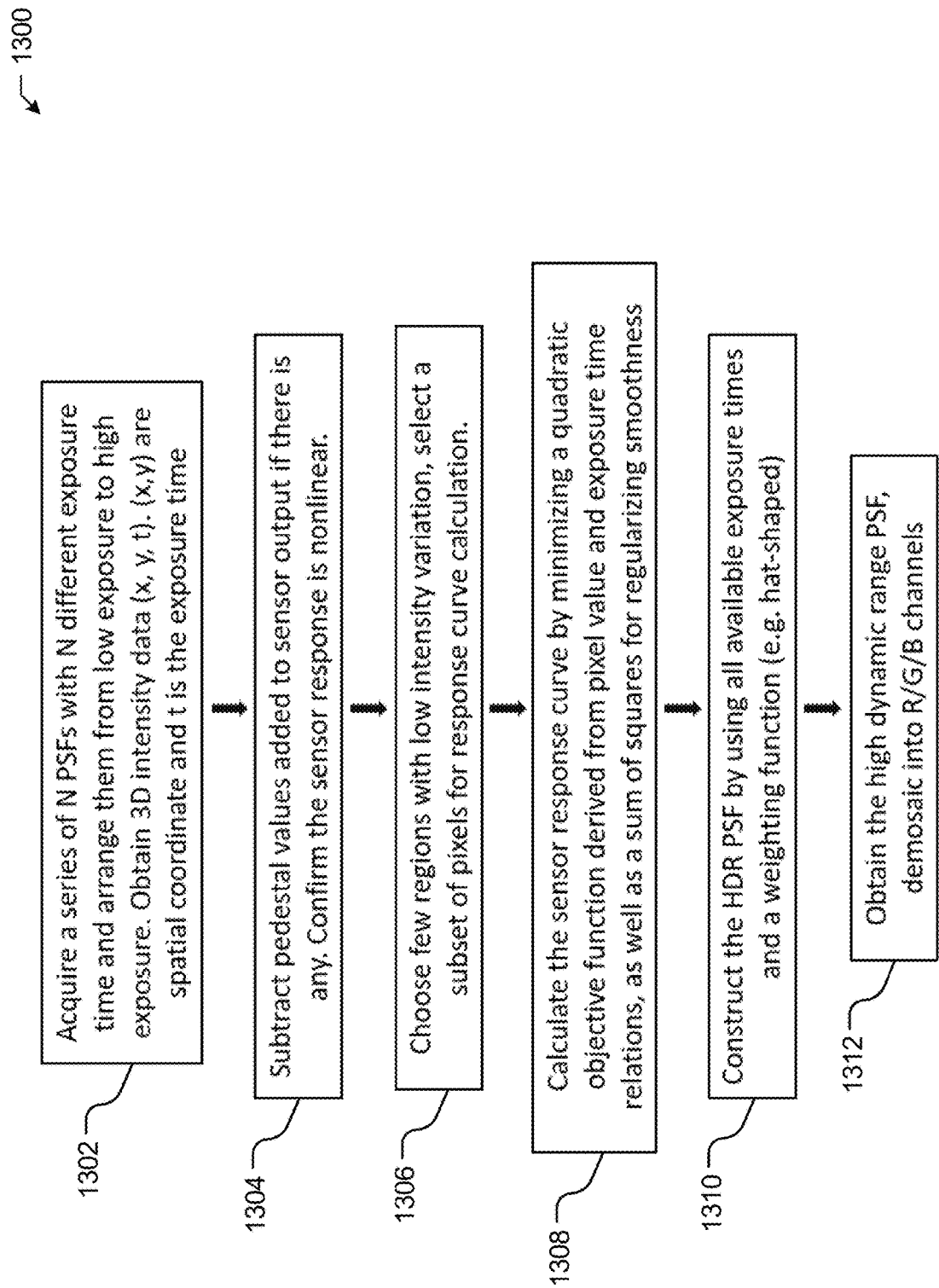
FIG. 13 illustrates flow diagram of a method for generating high dynamic range (HDR) PSFs based on a nonlinear response image sensor.

FIG. 13 illustrates a flow diagram of a method 1300 for generating high dynamic range (HDR) PSFs (e.g., individually for each of the RGB color components and/or one or more particular monochromatic color components) based on a nonlinear response image sensor, in accordance with the presently disclosed embodiments. In particular embodiments, the method 1300 may be performed alternative to, or in addition to, the method 600 as discussed above. The method 1300 may be performed utilizing one or more processing devices (e.g., the one or more processors 104 of the electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1300 may begin at block 1302 with the one or more processing devices (e.g., the one or more processors 104 of the electronic device 102) capturing an N number of PSFs with N number of different exposures, arranging or rearranging the N number of PSFs with N different exposures from lowest exposure time to highest exposure time, and determining 3D intensity datasets (x, y, t), in which (x, y) may represent a pixel spatial location while (t) may represent a respective exposure time that may be associated with a respective pixel spatial location (x,y). For example, in particular embodiments, N number of exposure times may be selected based on the image sensor 122 bit depth and the dynamic range of the one or more PSFs being captured. The method 1300 may then continue at block 1304 with the one or more processing devices (e.g., the one or more processors 104 of the electronic device 102) subtracting any pedestal values added to the image sensor 122 output and confirming that the image sensor 122 output is nonlinear. The method 1300 may continue at block 1306 with the one or more processing devices (e.g., the one or more processors 104 of the electronic device 102) selecting set of pixel regions with low pixel intensity variations and selecting a subset of pixels for image sensor 122 response curve calculation.

The method 1300 may continue at block 1308 with the one or more processing devices (e.g., the one or more processors 104 of the electronic device 102) calculating the image sensor 122 response curve by minimizing quadratic objective function derived based on the respective pixel intensity values and respective exposure times and a sum of squares smoothness term. The method 1300 may continue at block 1310 with the one or more processing devices (e.g., the one or more processors 104 of the electronic device 102) generating the HDR PSF by utilizing all of the exposure times and a weighting function (e.g., hat-shaped weighting function) to generate a weighted average pixel intensity value (e.g., irradiance value) may indicate an irradiance value at each pixel location (x, y) due to the one or more captured PSFs. The method 1300 may then conclude at block 1312 with the one or more processing devices (e.g., the one or more processors 104 of the electronic device 102) generating HDR PSFs (e.g., individually for each of the RGB color components and/or one or more particular monochromatic color components) utilizing, example, a nonlinear response image sensor 122.

Figure 14:
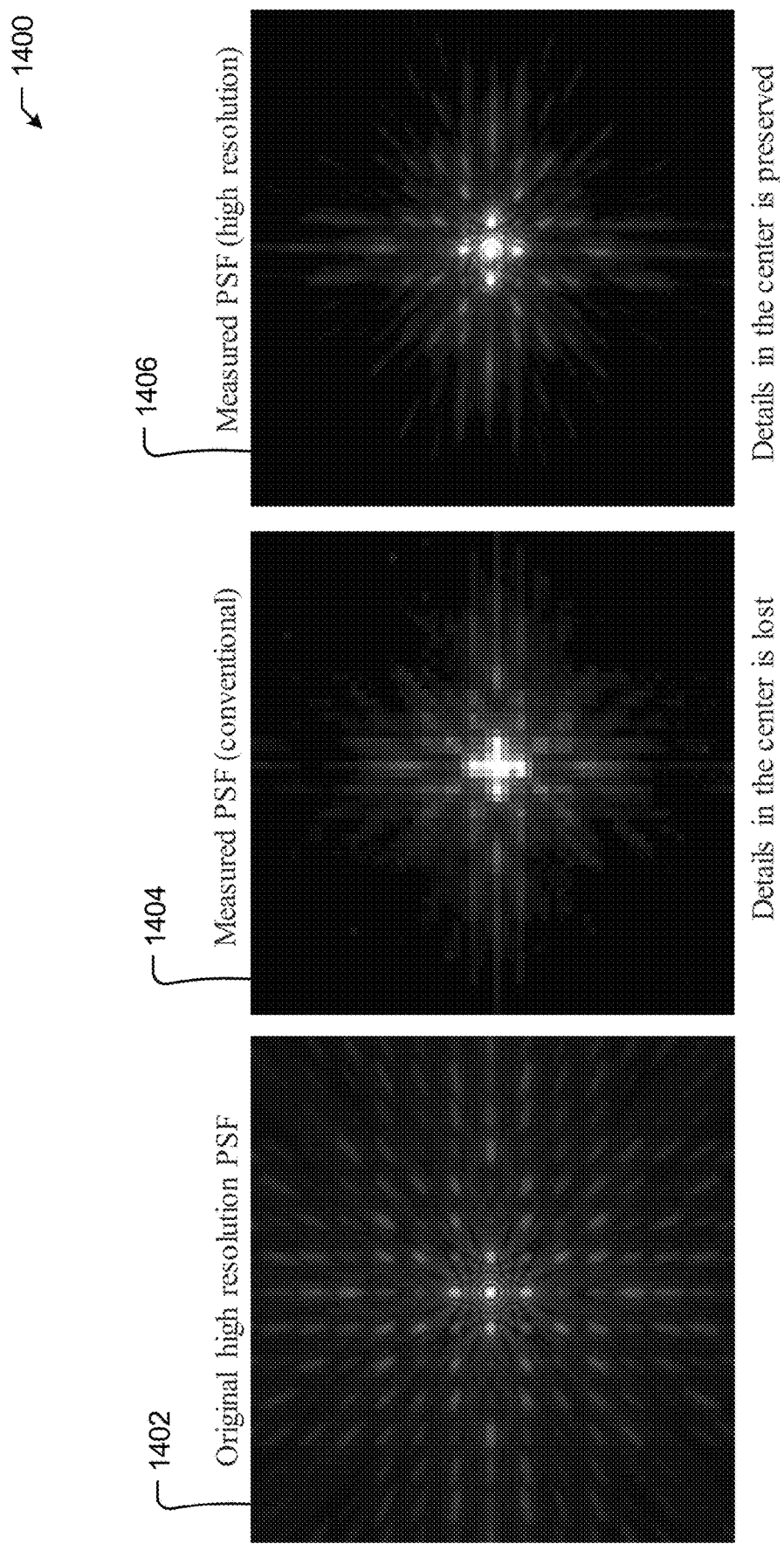
FIGS. 14-17 illustrate one or more running examples for generating a high resolution HDR PSF and determining a spatially invariant low-resolution PSF for image reconstruction based thereon.

FIGS. 14-17 illustrate one or more running examples of the presently disclosed techniques for generating a high resolution HDR PSF and determining a spatially invariant low-resolution PSF for image reconstruction based thereon, in accordance with the presently disclosed embodiments. For example, the example 1400 of FIG. 14 display the example PSF captured images 1402, 1404, and 1406 depicting, for example, a comparison of an original image PSF capture via computer simulation 1402 and the resulting image PSF capture 1404 utilizing, for example, a low resolution PSF measurement system 200 as compared to a resulting image PSF capture 1406 utilizing, for example, a high resolution PSF measurement system 500, in accordance with the presently disclosed embodiments. Thus, FIG. 14 shows that the PSF image 1404 captured with the low resolution PSF measurement system 200 may not recover all of the light information in the original image PSF capture 1402. However, utilizing the high resolution PSF measurement system 500, the captured PSF image 1406 more closely matches the original image PSF capture 1402.

Figure 15:
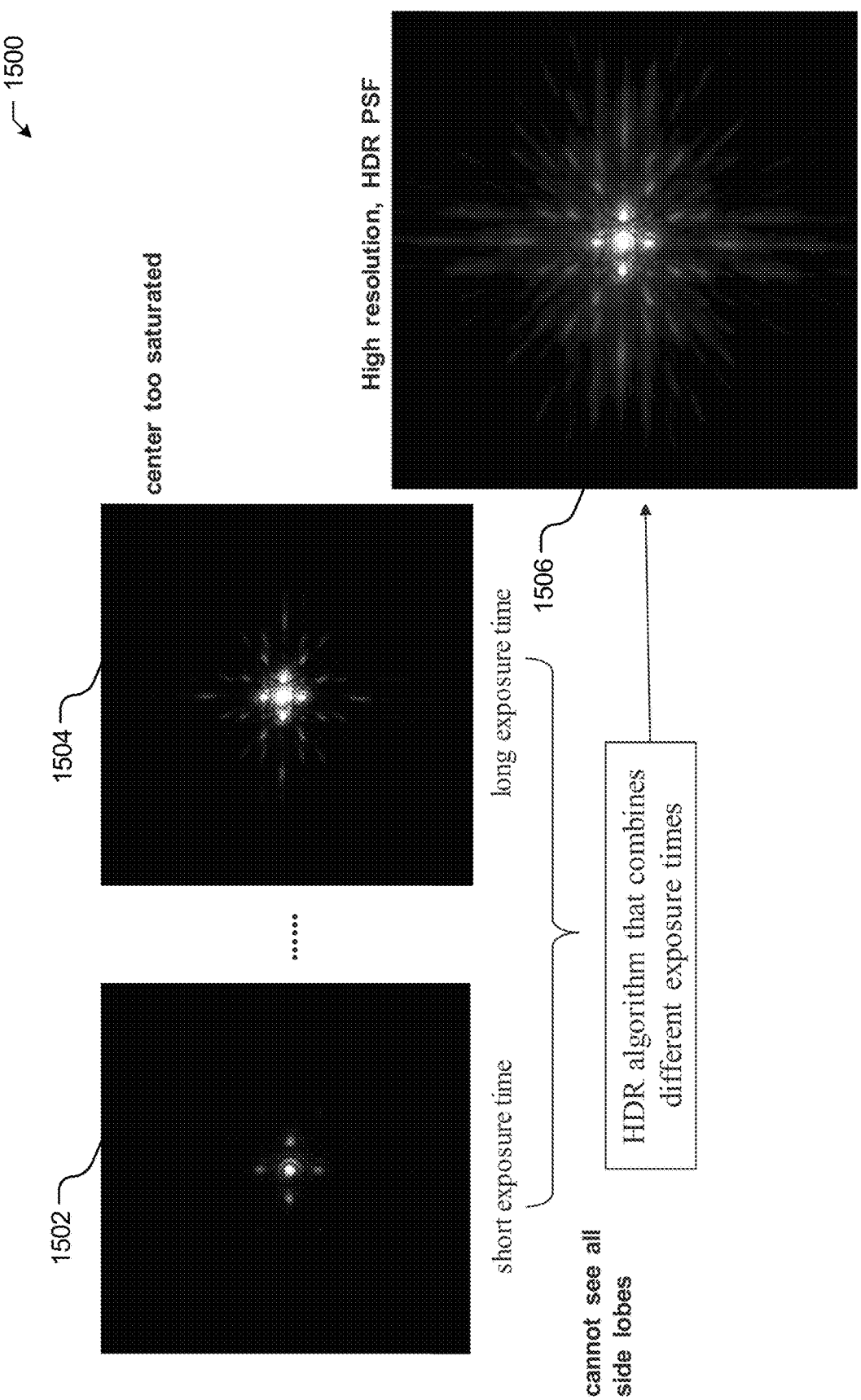
Figure 16:
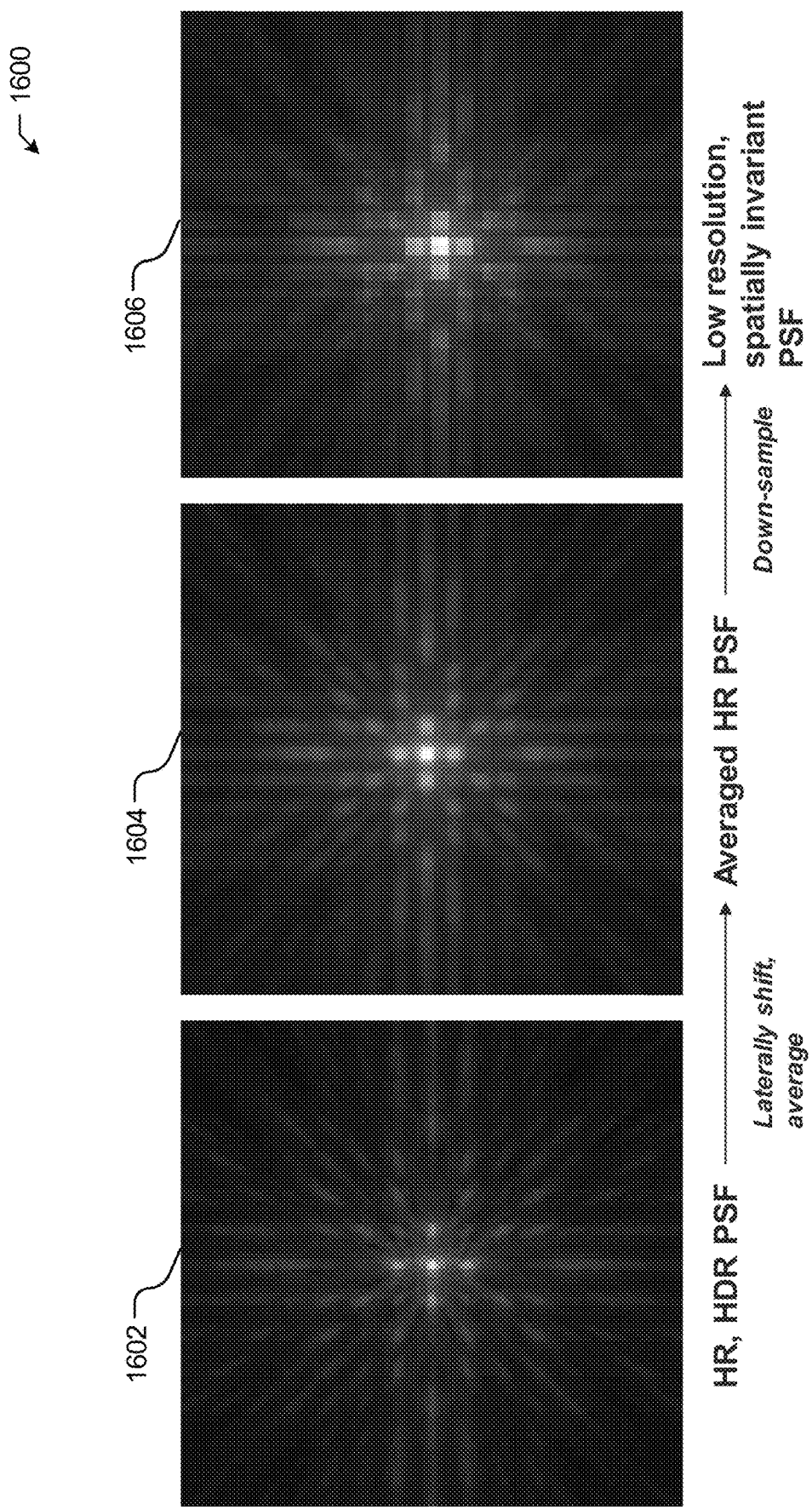
Figure 17:
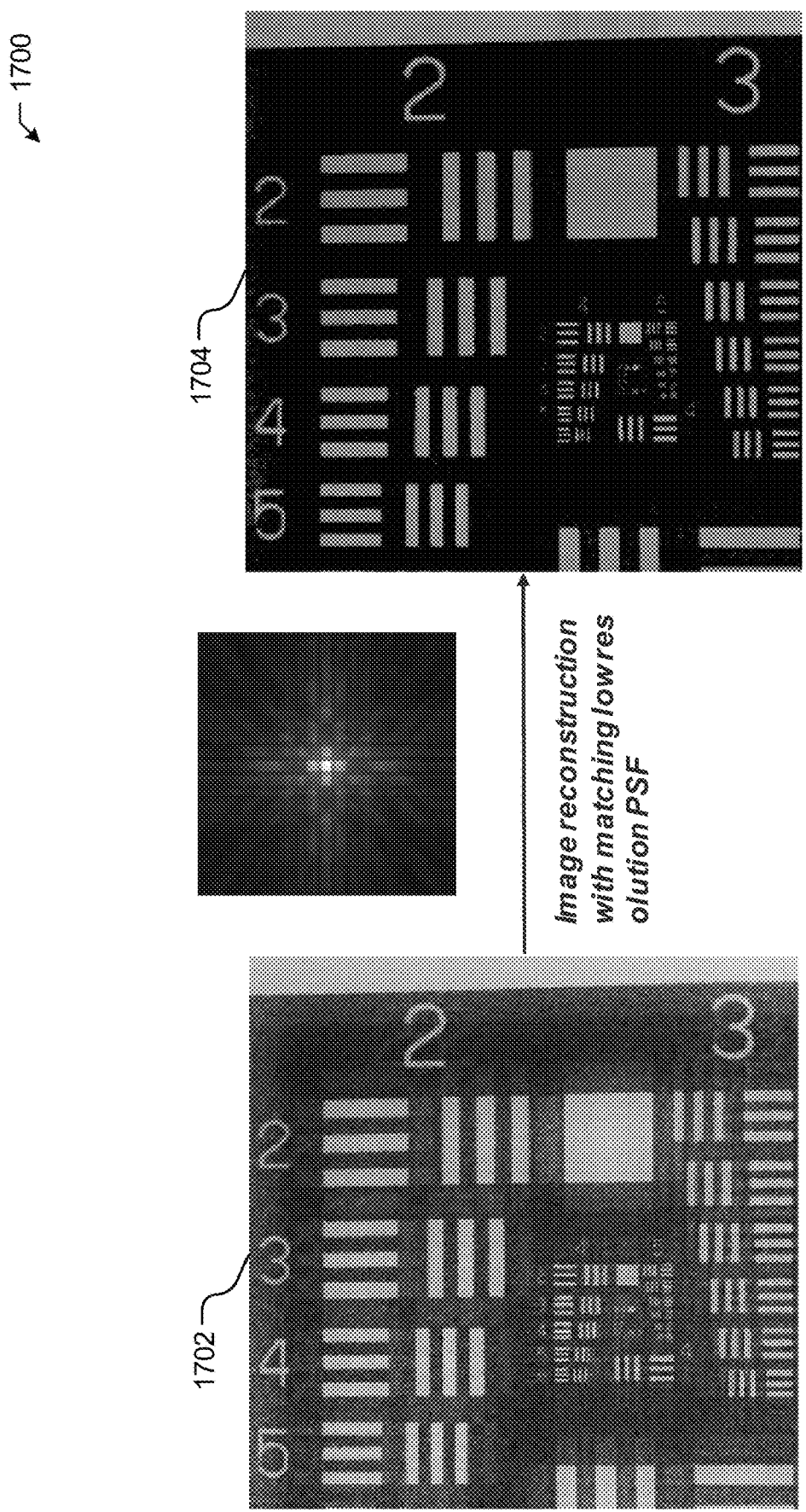

In particular embodiments, the example 1500 of FIG. 15 example PSF captured images 1502, 1504, and 1506 depict the resulting image PSF capture 1502 (e.g., captured over a short exposure time) and resulting image PSF capture 1504 (e.g., captured over a long exposure time) prior to applying the present HDR PSF techniques. On the other hand, the resulting image PSF capture 1506 (e.g., generated based on the PSF captured over multiple exposure times) and applying the present HDR PSF techniques, in accordance with the presently disclosed embodiments. Indeed, the resulting image PSF capture 1506 illustrates a high resolution HDR PSF, in accordance with the presently disclosed embodiments. FIG. 16 and FIG. 17 illustrate examples 1600 and 1700 of generating the low resolution spatially-invariant PSF for image reconstruction. For example, the example image 1602 illustrates the high resolution HDR PSF, the example image 1604 illustrates the laterally shifted and averaged high resolution PSF, and the example image 1606 illustrates the digitally down-sampled low resolution spatially-invariant PSF to be utilized for image reconstruction. For example, referring to FIG. 17, the example image 1702 illustrates blurred image, and the example image 1704 illustrates the digitally down-sampled low resolution spatially-invariant PSF based reconstructed image.

Figure 18:
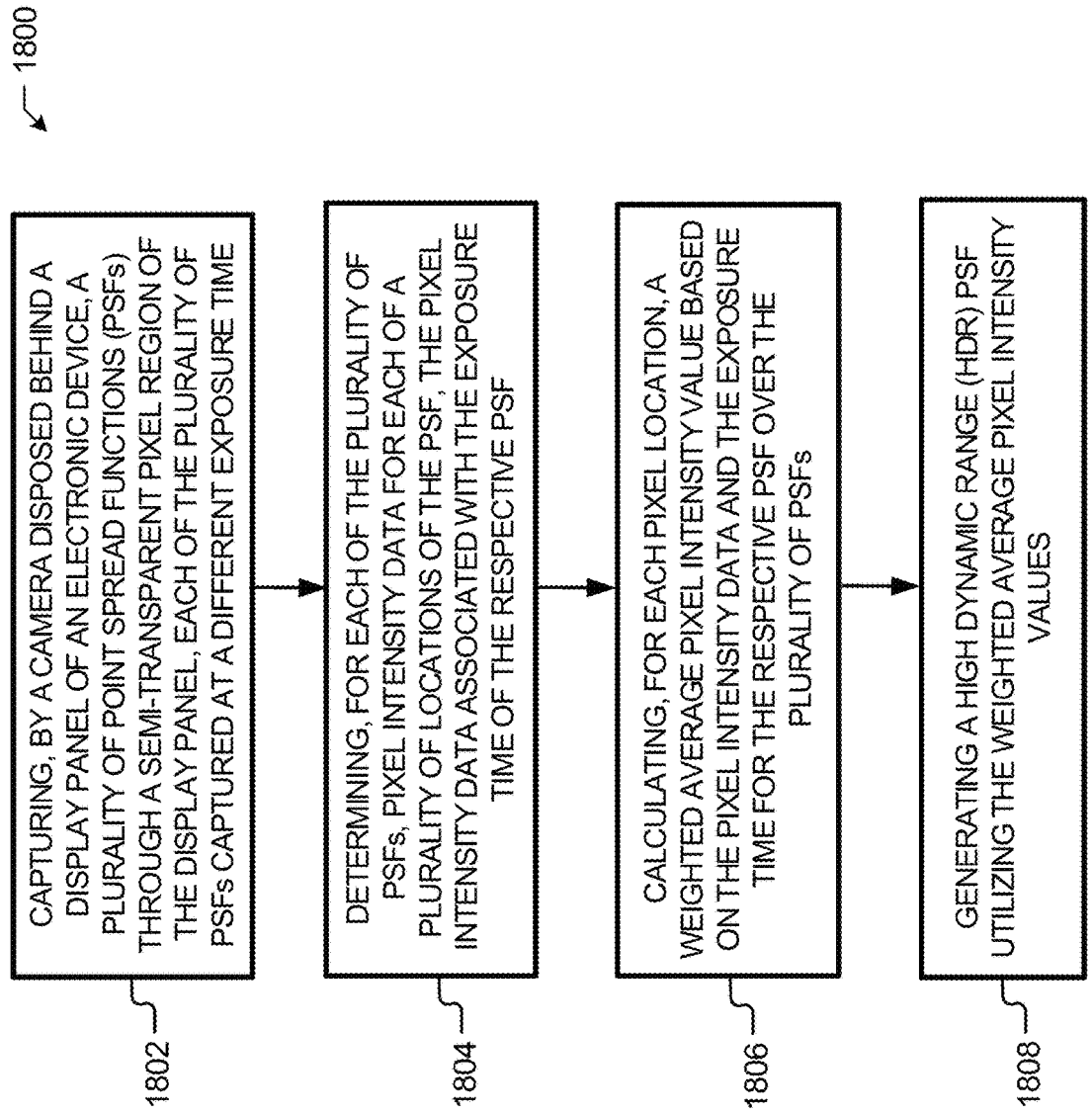
FIG. 18 illustrates a flow diagram of a method for generating a high dynamic range (HDR) point spread function (PSF) for image reconstruction based thereon.

FIG. 18 illustrates a flow diagram of a method 1800 for generating a high dynamic range (HDR) point spread function (PSF) for image reconstruction based thereon, in accordance with the presently disclosed embodiments. The method 1800 may be performed utilizing one or more processing devices (e.g., the one or more processors 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1800 may begin block 1802 with the one or more processing devices (e.g., one or more processors 104 of the electronic device 102) capturing, by a camera disposed behind a display panel of the electronic device, a plurality of point spread functions (PSFs) through a semi-transparent pixel region of the display panel, in which each of the plurality of PSFs is captured at a different exposure time. The method 1800 may then continue at block 1804 with the one or more processing devices (e.g., one or more processors 104 of the electronic device 102) determining, for each of the plurality of PSFs, pixel intensity data for each of a plurality of pixel locations of the PSF, in which the pixel intensity data is associated with the exposure time of the respective PSF. The method 1800 may then continue at block 1806 with the one or more processing devices (e.g., one or more processors 104 of the electronic device 102) calculating, for each pixel location, a weighted average pixel intensity value based on the pixel intensity data and the exposure time for the respective pixel location over the plurality of PSFs. The method 1800 may then conclude at block 1808 with the one or more processing devices (e.g., one or more processors 104 of the electronic device 102) generating a high dynamic range (HDR) PSF utilizing the weighted average pixel intensity values.

In this way, the present embodiments may increase the viewing area and the resolution of the display panel 112 of the electronic device 102 by disposing one or more front-facing cameras 110 of the electronic device 102 behind the display panel 112. For example, because of the increase in display area (e.g., having eliminated the display area typically designated for the one or more front-facing cameras 110), the electronic device 102 may further provide for improved (GUIs) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device 102, as well as allow a user of the electronic device 102 to display higher resolution images on the display panel 112 of the electronic device 102. Still further, because the one or more front-facing cameras 110 may be placed behind the display panel 112, the present techniques may allow the one or more front-facing cameras 110 to be placed anywhere, such as in a center area of the display panel 112 (e.g., as opposed to in a corner or along an edge of the display panel 112) of the electronic device 102. This may provide an improved user experience and/or GUI, such as by directing a user taking a selfie to gaze at the center area of the display panel 112, and further by giving the impression of eye-to-eye contact with another user when the user is participating in a videoconference, a videotelephonic exchange, or other video-streaming service.

Figure 19:
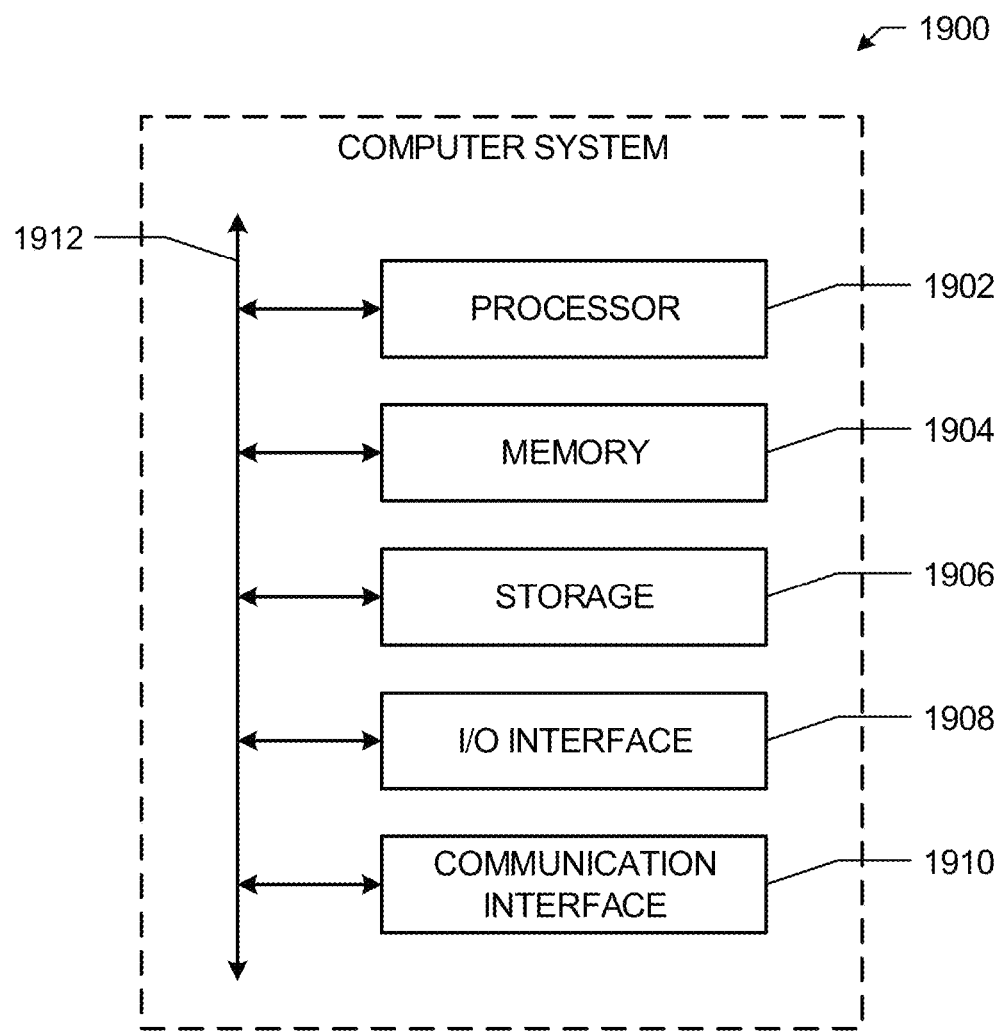
FIG. 19 illustrates an example computer system.

FIG. 19 illustrates an example computer system 1900 that may be utilized for generating a high dynamic range (HDR) point spread function (PSF) and determining a spatially invariant low-resolution PSF for image reconstruction based thereon, in accordance with the presently disclosed embodiments. In particular embodiments, one or more computer systems 1900 perform one or more steps of one or more methods described or illustrated herein. In particular embodiments, one or more computer systems 1900 provide functionality described or illustrated herein. In particular embodiments, software running on one or more computer systems 1900 performs one or more steps of one or more methods described or illustrated herein or provides functionality described or illustrated herein. Particular embodiments include one or more portions of one or more computer systems 1900. Herein, reference to a computer system may encompass a computing device, and vice versa, where appropriate. Moreover, reference to a computer system may encompass one or more computer systems, where appropriate.

This disclosure contemplates any suitable number of computer systems 1900. This disclosure contemplates computer system 1900 taking any suitable physical form. As example and not by way of limitation, computer system 1900 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1900 may include one or more computer systems 1900; be unitary or distributed; span multiple locations; span multiple machines; span multiple data centers; or reside in a cloud, which may include one or more cloud components in one or more networks.

Where appropriate, one or more computer systems 1900 may perform without substantial spatial or temporal limitation one or more steps of one or more methods described or illustrated herein. As an example, and not by way of limitation, one or more computer systems 1900 may perform in real time or in batch mode one or more steps of one or more methods described or illustrated herein. One or more computer systems 1900 may perform at different times or at different locations one or more steps of one or more methods described or illustrated herein, where appropriate.

In particular embodiments, computer system 1900 includes a processor 1902, memory 1904, storage 1906, an input/output (I/O) interface 1906, a communication interface 1910, and a bus 1912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1902 includes hardware for executing instructions, such as those making up a computer program. As an example, and not by way of limitation, to execute instructions, processor 1902 may retrieve (or fetch) the instructions from an internal register, an internal cache, memory 1904, or storage 1906; decode and execute them; and then write one or more results to an internal register, an internal cache, memory 1904, or storage 1906. In particular embodiments, processor 1902 may include one or more internal caches for data, instructions, or addresses. This disclosure contemplates processor 1902 including any suitable number of any suitable internal caches, where appropriate. As an example, and not by way of limitation, processor 1902 may include one or more instruction caches, one or more data caches, and one or more translation lookaside buffers (TLBs). Instructions in the instruction caches may be copies of instructions in memory 1904 or storage 1906, and the instruction caches may speed up retrieval of those instructions by processor 1902.

Data in the data caches may be copies of data in memory 1904 or storage 1906 for instructions executing at processor 1902 to operate on; the results of previous instructions executed at processor 1902 for access by subsequent instructions executing at processor 1902 or for writing to memory 1904 or storage 1906; or other suitable data. The data caches may speed up read or write operations by processor 1902. The TLBs may speed up virtual-address translation for processor 1902. In particular embodiments, processor 1902 may include one or more internal registers for data, instructions, or addresses. This disclosure contemplates processor 1902 including any suitable number of any suitable internal registers, where appropriate. Where appropriate, processor 1902 may include one or more arithmetic logic units (ALUs); be a multi-core processor; or include one or more processors 1902. Although this disclosure describes and illustrates a particular processor, this disclosure contemplates any suitable processor.

In particular embodiments, memory 1904 includes main memory for storing instructions for processor 1902 to execute or data for processor 1902 to operate on. As an example, and not by way of limitation, computer system 1900 may load instructions from storage 1906 or another source (such as, for example, another computer system 1900) to memory 1904. Processor 1902 may then load the instructions from memory 1904 to an internal register or internal cache. To execute the instructions, processor 1902 may retrieve the instructions from the internal register or internal cache and decode them. During or after execution of the instructions, processor 1902 may write one or more results (which may be intermediate or final results) to the internal register or internal cache. Processor 1902 may then write one or more of those results to memory 1904. In particular embodiments, processor 1902 executes only instructions in one or more internal registers or internal caches or in memory 1904 (as opposed to storage 1906 or elsewhere) and operates only on data in one or more internal registers or internal caches or in memory 1904 (as opposed to storage 1906 or elsewhere).

One or more memory buses (which may each include an address bus and a data bus) may couple processor 1902 to memory 1904. Bus 1912 may include one or more memory buses, as described below. In particular embodiments, one or more memory management units (MMUs) reside between processor 1902 and memory 1904 and facilitate accesses to memory 1904 requested by processor 1902. In particular embodiments, memory 1904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1904 may include one or more memories 1904, where appropriate. Although this disclosure describes and illustrates particular memory, this disclosure contemplates any suitable memory.

In particular embodiments, storage 1906 includes mass storage for data or instructions. As an example, and not by way of limitation, storage 1906 may include a hard disk drive (HDD), a floppy disk drive, flash memory, an optical disc, a magneto-optical disc, magnetic tape, or a Universal Serial Bus (USB) drive or a combination of two or more of these. Storage 1906 may include removable or non-removable (or fixed) media, where appropriate. Storage 1906 may be internal or external to computer system 1900, where appropriate. In particular embodiments, storage 1906 is non-volatile, solid-state memory. In particular embodiments, storage 1906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1906 taking any suitable physical form. Storage 1906 may include one or more storage control units facilitating communication between processor 1902 and storage 1906, where appropriate. Where appropriate, storage 1906 may include one or more storages 1906. Although this disclosure describes and illustrates particular storage, this disclosure contemplates any suitable storage.

In particular embodiments, I/O interface 1906 includes hardware, software, or both, providing one or more interfaces for communication between computer system 1900 and one or more I/O devices. Computer system 1900 may include one or more of these I/O devices, where appropriate. One or more of these I/O devices may enable communication between a person and computer system 1900. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1906 for them. Where appropriate, I/O interface 1906 may include one or more device or software drivers enabling processor 1902 to drive one or more of these I/O devices. I/O interface 1906 may include one or more I/O interfaces 1906, where appropriate. Although this disclosure describes and illustrates a particular I/O interface, this disclosure contemplates any suitable I/O interface.

In particular embodiments, communication interface 1910 includes hardware, software, or both providing one or more interfaces for communication (such as, for example, packet-based communication) between computer system 1900 and one or more other computer systems 1900 or one or more networks. As an example, and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1910 for it.

As an example, and not by way of limitation, computer system 1900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1900 may include any suitable communication interface 1910 for any of these networks, where appropriate. Communication interface 1910 may include one or more communication interfaces 1910, where appropriate. Although this disclosure describes and illustrates a particular communication interface, this disclosure contemplates any suitable communication interface.

In particular embodiments, bus 1912 includes hardware, software, or both coupling components of computer system 1900 to each other. As an example, and not by way of limitation, bus 1912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1912 may include one or more buses 1912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
    capturing, by a camera disposed behind a display panel of the electronic device, a plurality of point spread functions (PSFs) through a semi-transparent pixel region of the display panel, wherein each of the plurality of PSFs is captured at a particular exposure time;
    generating an intensity dataset corresponding to the plurality of PSFs, wherein the intensity dataset comprises a plurality of pixel locations and a plurality of exposure times associated with the pixel locations;
    calculating a plurality of noise statistics values for the plurality of pixel locations of the intensity dataset, respectively;
    generating a pixel mask, wherein the pixel mask filters the plurality of pixel locations for pixel locations with respective noise statistics values within a particular threshold; and
    generating one or more high dynamic range (HDR) PSFs utilizing the plurality of PSFs and the pixel mask.

2. The method of claim 1, wherein a particular number of the plurality of exposure times is selected based on at least a bit depth of a sensor disposed inside the camera.

3. The method of claim 1, wherein generating the one or more HDR PSFs comprises applying the pixel mask to the plurality of PSFs to remove bright pixel artifacts or saturated pixels.

4. The method of claim 1, wherein generating the one or more HDR PSFs further comprises:
    calculating, for each of the plurality of pixel locations, a ratio of the noise statistics values within the particular threshold;
    calculating a weighted average pixel intensity value across the plurality of exposure times associated with the pixel locations, wherein the weighted average pixel intensity value indicates an irradiance value at each of the pixel locations; and
    combining the plurality of exposure times and the irradiance value at each of the pixel locations to generate the one or more HDR PSFs.

5. The method of claim 1, wherein capturing, by the camera disposed behind the display panel of the electronic device, the plurality of PSFs comprises capturing the plurality of PSFs through one or more magnifying optical elements disposed between a camera lens and an image sensor of the camera.

6. The method of claim 5, wherein the one or more magnifying optical elements comprises one or more objective lens and one or more tube lens.

7. The method of claim 1, wherein generating the one or more HDR PSFs comprises generating a respective HDR PSF for each of a RGB color component.

8. An electronic device comprising:
    a display panel;
    a camera disposed behind the display panel;
    one or more non-transitory computer-readable storage media including instructions; and
    one or more processors coupled to the storage media and the camera, the one or more processors configured to execute the instructions to:
        capture, by a camera disposed behind the display panel of the electronic device, a plurality of point spread functions (PSFs) through a semi-transparent pixel region of the display panel, wherein each of the plurality of PSFs is captured at a particular exposure time;
        generate an intensity dataset corresponding to the plurality of PSFs, wherein the intensity dataset comprises a plurality of pixel locations and a plurality of exposure times associated with the pixel locations;
        calculate a plurality of noise statistics values for the plurality of pixel locations of the intensity dataset, respectively;
        generate a pixel mask, wherein the pixel mask filters the plurality of pixel locations for pixel locations with respective noise statistics values within a particular threshold; and generate one or more high dynamic range (HDR) PSFs utilizing the plurality of PSFs and the pixel mask.

9. The electronic device of claim 8, wherein a particular number of the plurality of exposure times is selected based on at least a bit depth of a sensor disposed inside the camera.

10. The electronic device of claim 8, wherein the instructions to generate the one or more HDR PSFs comprises instructions to apply the pixel mask to the plurality of PSFs to remove bright pixel artifacts or saturated pixels.

11. The electronic device of claim 8, wherein the instructions to generate the one or more HDR PSFs further comprise instructions to:
    calculate, for each of the plurality of pixel locations, a ratio of the noise statistics values within the particular threshold;
    calculate a weighted average pixel intensity value across the plurality of exposure times associated with the pixel locations, wherein the weighted average pixel intensity value indicates an irradiance value at each of the pixel locations; and
    combine the plurality of exposure times and the irradiance value at each of the pixel locations to generate the one or more HDR PSFs.

12. The electronic device of claim 8, wherein the instructions to capture, by the camera disposed behind the display panel, the plurality of PSFs further comprise instructions to capture the plurality of PSFs through one or more magnifying optical elements disposed between a camera lens and an image sensor of the camera.

13. The electronic device of claim 12, wherein the one or more magnifying optical elements comprises one or more objective lens and one or more tube lens.

14. The electronic device of claim 8, wherein the instructions to generate one or more HDR PSFs further comprise instructions to generate a respective HDR PSF for each of a RGB color component.

15. A non-transitory computer-readable medium comprising instructions that, when executed by one or more processors of an electronic device, cause the one or more processors to:
    capture, by a camera disposed behind the display panel of the electronic device, a plurality of point spread functions (PSFs) through a semi-transparent pixel region of the display panel, wherein each of the plurality of PSFs is captured at a particular exposure time;
    generate an intensity dataset corresponding to the plurality of PSFs, wherein the intensity dataset comprises a plurality of pixel locations and a plurality of exposure times associated with the pixel locations;
    calculate a plurality of noise statistics values for the plurality of pixel locations of the intensity dataset, respectively;
    generate a pixel mask, wherein the pixel mask filters the plurality of pixel locations for pixel locations with respective noise statistics values within a particular threshold; and
    generate one or more high dynamic range (HDR) PSFs utilizing the plurality of PSFs and the pixel mask.

16. The non-transitory computer-readable medium of claim 15, wherein a particular number of the plurality of exposure times is selected based on at least a bit depth of a sensor disposed inside the camera.

17. The non-transitory computer-readable medium of claim 15, wherein the instructions to generate the one or more HDR PSFs comprises instructions to apply the pixel mask to the plurality of PSFs to remove bright pixel artifacts or saturated pixels.

18. The non-transitory computer-readable medium of claim 15, wherein the instructions to generate the one or more HDR PSFs further comprise instructions to:
    calculate, for each of the plurality of pixel locations, a ratio of the noise statistics values within the particular threshold;
    calculate a weighted average pixel intensity value across the plurality of exposure times associated with the pixel locations, wherein the weighted average pixel intensity value indicates an irradiance value at each of the pixel locations; and
    combine the plurality of exposure times and the irradiance value at each of the pixel locations to generate the one or more HDR PSFs.

19. The non-transitory computer-readable medium of claim 15, wherein the instructions to capture, by the camera disposed behind the display panel, the plurality of PSFs further comprise instructions to capture the plurality of PSFs through one or more magnifying optical elements disposed between a camera lens and an image sensor of the camera.

20. The non-transitory computer-readable medium of claim 19, wherein the one or more magnifying optical elements comprises one or more objective lens and one or more tube lens.

* * * * *